(12) United States Patent
Zhang et al.

(10) Patent No.: US 11,659,167 B2
(45) Date of Patent: May 23, 2023

(54) SIGNALING FOR REFERENCE PICTURE RESAMPLING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Zhipin Deng, Beijing (CN); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/727,542

(22) Filed: Apr. 22, 2022

(65) Prior Publication Data

US 2022/0272324 A1 Aug. 25, 2022

Related U.S. Application Data

(63) Continuation of application No. PCT/CN2020/122644, filed on Oct. 22, 2020.

(30) Foreign Application Priority Data

Oct. 23, 2019 (WO) .............. PCT/CN/2019/112820

(51) Int. Cl.
*H04N 19/70* (2014.01)
*H04N 19/105* (2014.01)
(Continued)

(52) U.S. Cl.
CPC ......... *H04N 19/105* (2014.11); *H04N 19/132* (2014.11); *H04N 19/176* (2014.11); *H04N 19/70* (2014.11)

(58) Field of Classification Search
CPC .. H04N 19/105; H04N 19/132; H04N 19/176; H04N 19/70
See application file for complete search history.

(56) References Cited

U.S. PATENT DOCUMENTS 9,509,999 B2  11/2016  Seregin et al.
9,992,493 B2   6/2018  Chen et al.
(Continued)

FOREIGN PATENT DOCUMENTS

CN   107925772 A   4/2018
CN   108293136 A   7/2018
(Continued)

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019 document JVET-O2001, 2019. (Year: 2019).*

(Continued)

*Primary Examiner* — Anner N Holder
(74) *Attorney, Agent, or Firm* — Perkins Coie LLP

(57) ABSTRACT

A method of video processing includes determining, for a conversion between a current block of a video and a coded representation of the video, that a resolution of a current picture containing the current block and a reference picture used for the conversion are different, and performing the conversion based on the determining such that predicted values of a group of samples of the current block are generated using a horizontal or a vertical interpolation filter.

21 Claims, 11 Drawing Sheets

(51) Int. Cl.
*H04N 19/132* (2014.01)
*H04N 19/176* (2014.01)

(56) References Cited

U.S. PATENT DOCUMENTS

| | | | |
|---|---|---|---|
| 2003/0138152 A1 | 7/2003 | Fenney | |
| 2005/0025459 A1* | 2/2005 | Kato | H04N 21/235 386/326 |
| 2005/0047506 A1 | 3/2005 | Kadono et al. | |
| 2005/0052294 A1 | 3/2005 | Liang et al. | |
| 2008/0267291 A1 | 10/2008 | Vieron et al. | |
| 2012/0230393 A1 | 9/2012 | Naing et al. | |
| 2013/0129241 A1 | 5/2013 | Wang et al. | |
| 2017/0048526 A1 | 2/2017 | He | |
| 2020/0045325 A1 | 2/2020 | Xu et al. | |
| 2020/0260070 A1* | 8/2020 | Yoo | H04N 19/103 |
| 2021/0092447 A1* | 3/2021 | Choi | H04N 19/172 |
| 2021/0120262 A1 | 4/2021 | Chen et al. | |
| 2021/0281852 A1 | 9/2021 | Alshina et al. | |
| 2021/0297702 A1 | 9/2021 | Nakagami | |
| 2021/0392344 A1 | 12/2021 | Bossen et al. | |
| 2021/0409785 A1* | 12/2021 | Wang | H04N 19/86 |
| 2022/0078484 A1 | 3/2022 | Filippov et al. | |
| 2022/0272330 A1 | 8/2022 | Zhang et al. | |

FOREIGN PATENT DOCUMENTS

| | | |
|---|---|---|
| CN | 109874011 A | 6/2019 |
| CN | 110214447 A | 9/2019 |
| WO | 2016070845 A1 | 5/2016 |
| WO | 2017051072 A1 | 3/2017 |
| WO | 2017201141 A1 | 11/2017 |
| WO | 2019010267 A1 | 1/2019 |
| WO | 2019072368 A1 | 4/2019 |
| WO | 2019072370 A1 | 4/2019 |
| WO | 2019126293 A1 | 6/2019 |
| WO | 2021016315 A1 | 1/2021 |

OTHER PUBLICATIONS

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019. (Year: 2019).*

Bross et al. "Versatile Video Coding (Drafts)," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q2001, 2020. (Year: 2020).*

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019 document JVET-O2001, 2019.

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Affine Merge Enhancement with Simplification (Test 4.2.2)." Joint Video Experts Team (JVET) of ITU-T SG 16 WP 3 and ISO/IEC JTC 1/SC 29/WG 11 12th Meeting: Macao, CN, Oct. 3-12, 2018, document JVET-L0368, 2018.

Chen et al. "CE4: Separate list for Sub-Block Merge Candidates (Test 4.2.8)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0369, 2018.

Chen et al. "AHG 19: Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0279, 2019.

Chen et atl. "CE9: Removal of 4xN/8x8 CUs and Boundary Padding Process from DMVR (Test 9.1.1)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0407, 2019.

Chen et al. "AHG 8: Adaptive Resolution Change," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0303, 2019.

Hanhart et al. "CE13: Perp with Horizontal Geometry Padding of Reference Pictures (Test 3.3)," Joint Video Experts Team (JVET) of ITU-T SG 16 WP 3 and ISO/IEC JTC 1/SC 29/WG 11 12th Meeting: Macau, CN, Oct. 3-12, 2018, document JVET-L0231, 2018.

Hannuksela et al. "Use Cases and Proposed Design Choices for Adaptive Resolution Changing (ARC)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0259, Mar. 2019.

Hannuksela et al. "AHG19: On Adaptive Resolution Changing," Joint Video Experts Team (JVET) of ITU-T SG 16 NP 3 and ISO/IEC JTC 1/SC 29/WG 11 14th Meeting: Geneva, CH, Mar. 19-27, 2019, document JVET-N0048, 2019.

He et al. "AHG8: On Adaptive Resolution Change Constraint," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0184, 2019.

Heng et al. "AHG16/AHG8: Proposed Cleanup for Reference Wraparound," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0070, 2019.

Hong et al. "AHG19: Adaptive Resolution Change (ARC) Support in WC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0118, 2019.

"Information Technology—High Efficiency Coding and Media Delivery in Heterogeneous Environments—Part 2: High Efficiency Video Coding" Apr. 20, 2018, ISO/DIS 23008, 4th Edition.

Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG1125th Meeting: Chengdu, CN, Oct. 14-21, 2016, document JCTVC-Y1002, 2016.

Samuelsson et al. "AHG 8: Adaptive Resolution Change (ARC) High-Level Syntax (HLS)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0204, 2019.

Samuelsson et al. "AHG 8: Adaptive Resolution Change (ARC) with Downsampling," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0240, 2019.

Topiwala et al. "Adaptive Resolution Change (ARC) in WC," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0319, 2019.

Wang et al. "On Adaptive Resolution Change (ARC) for VVC," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0135, 2019.

Wenger et al. "[AHG19] On Signaling of Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0052, 2019.

Xiu et al. "CE2/4/9-Related: Overflow Prevention for Motion Field Storage," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0334, 2019.

Zhou, Minhua. "CE4-Related: CE4 1 Spec Rext with Suggested Fixes," Joint Video Exploration Team (JVET) of ITU T SG 16 WP 3 and ISO/IEC JTC 1/SC 29/WG 11 17th Meeting: Brussels, BE, Jan. 7-17, 2020, document JVET-O0160, 2020.

(56) References Cited

OTHER PUBLICATIONS

JEM-7.0: https://jvet.hhi.fraunhofer.de/svn/svn_HMJEMSoftware/tags/HM-16.6-JEM-7.0.
https://vcgit.hhi.fraunhofer.de/jvet/VVCSoftware_VTM/tags/VTM-6.0.
International Search Report and Written Opinion from International Patent Application No. PCT/CN2020/110763 dated Nov. 18, 2020 (11 pages).
International Search Report and Written Opinion from International Patent Application No. PCT/CN2020/110768 dated Oct. 28, 2020 (10 pages).
International Search Report and Written Opinion from International Patent Application No. PCT/CN2020/122644 dated Jan. 20, 2021 (10 pages).
International Search Report and Written Opinion from International Patent Application No. PCT/CN2020/122645 dated Jan. 13, 2021 (15 pages).
Non Final Office Action from U.S. Appl. No. 17/568,599 dated Mar. 30, 2022.
"Math Review: Useful Math for Everyone," Universirty of Minnesota School of Public Health, accessed at http://www.mciph.umn.edu/mathrefresh/logs3.html#.~:text=1.146%20%E2%89%88%2014-, 2.,infinitely%20largeand%20negative%20power on Jul. 13, 2022 (2004).
Non Final Office Action from U.S. Appl. No. 17/727,486 dated Jul. 19, 2022.
Final Office Action from U.S. Appl. No. 17/568,599 dated Jul. 20, 2022.
Final Office Action from U.S. Appl. No. 17/727,486 dated Nov. 15, 2022.
Bross et al. "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, document JVET-R2001, 2020. (cited in EP20880299.1 Partial Supplementary ESR mailed Oct. 27, 2022).
Choi et al. "CE3: CCLM with Line Buffer Restriction (Test 5.2.7)," Joint Video Experts Team (JVET) of ITU-T SG 16 WP 3 and ISO/IEC JTC 1/SC 29/WG 11 12th Meeting, Macao, CN, Oct. 3-12, 2018, document JVET-L0136, 2018. (cited in EP20880299.1 Partial Supplementary ESR mailed Oct. 27, 2022).
Choi et al. "Non-CE3: CCL Prediction for 4:2:2 and 4:4:4 Color Format," Joint Video Experts Team (JVET) of ITU-T 3G 16 WP 3 and ISO/IEC JTC 1/SC 29/WG 11 14th Meeting, Geneva, CH Mar. 19-27, 2019, document JVET-N0229 2019. (cited in EP20880299.1 Partial Supplementary ESR mailed Oct. 27, 2022).
Partial Supplementary European Search Report from European Patent Application No. 20880299.1 dated Oct. 27, 2022 (16 pages).
Extended European Search Report from European Patent Application No. 20880056.5 dated Oct. 31, 2022 (9 pages).
Examination Report from Indian Patent Application No. 202227024299 dated Sep. 28, 2022 (7 pages).

\* cited by examiner

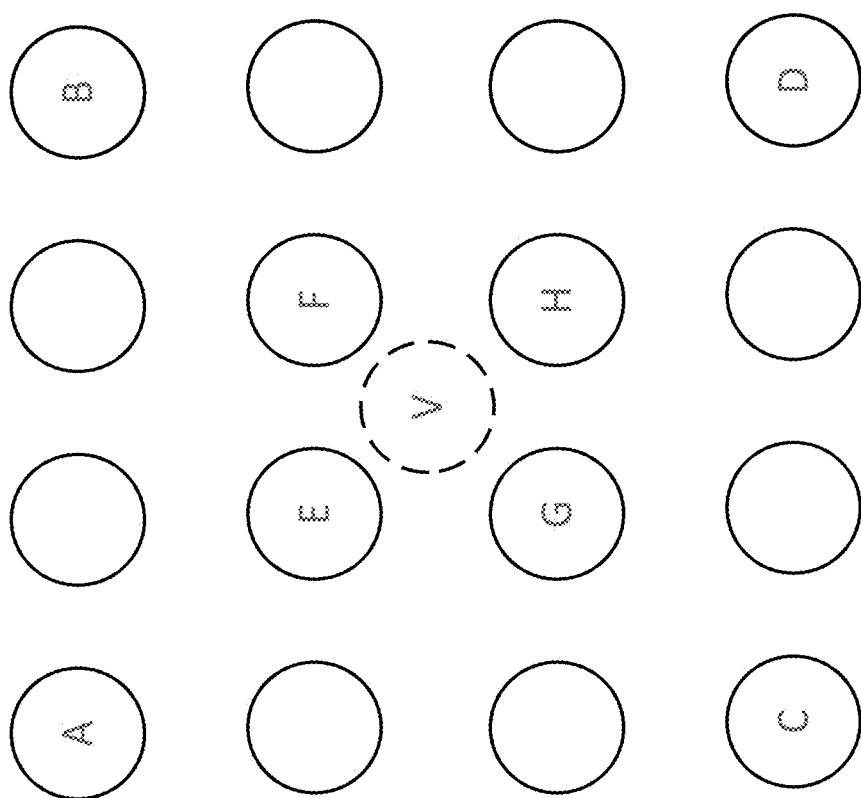

(12) United States Patent

SIGNALING FOR REFERENCE PICTURE RESAMPLING

CROSS REFERENCE TO RELATED APPLICATIONS

This application is a continuation of International Patent Application No. PCT/CN2020/122644, filed on Oct. 22, 2020, which claims the priority to and benefits of International Patent Application No. PCT/CN2019/112820, filed on Oct. 23, 2019. All the aforementioned patent applications are hereby incorporated by reference in their entireties.

TECHNICAL FIELD

This patent document relates to video coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to video and image coding and decoding in which current pictures and references pictures have different sizes or resolutions.

In one example aspect, a method of video processing is disclosed. The method includes performing a conversion between a current block of a current picture of a video and a coded representation of the video. The coded representation is according to a format rule. The format rule specifies to selectively include one or more syntax elements about a wraparound clipping operation applied to a reference picture for determining a prediction block for the current video block, wherein the wraparound clipping operation is used to reselect samples in the reference picture in case that a motion vector points to samples outside a bounding block in the reference picture.

In another example aspect, a method of video processing is disclosed. The method includes determining, for a conversion between a current block of a video and a coded representation of the video, that a resolution of a current picture containing the current block and a reference picture used for the conversion are different, and performing the conversion based on the determining such that predicted values of a group of samples of the current block are generated using a horizontal or a vertical interpolation filter.

In another example aspect, another method of video processing is disclosed. The method includes determining, for a conversion between a current block of a video and a coded representation of the video, that a resolution of a current picture containing the current block and a reference picture used for the conversion are different, and performing the conversion based on the determining such that predicted values of a group of samples of the current block are generated as an interpolated version of a virtual reference block that is generated by sample rate changing a region in the reference picture, wherein the sample rate changing depends on a height or a width of the current picture or the reference picture.

In another example aspect, another method of video processing is disclosed. The method includes determining, for a conversion between a current block of a video and a coded representation of the video, that a resolution of a current picture containing the current block and a reference picture used for the conversion are different, and based on the determining, deriving a top-left coordinate of a bounding block for reference sample padding based on a scheme that is dependent on a height or a width of the current picture or the reference picture, and performing the conversion using the derived top-left coordinate of the bounding box.

In another example aspect, another method of video processing is disclosed. The method includes determining, for a conversion between a current block in a current picture of a video and a coded representation of the video, a clipping operation applied to motion vector calculation according to a bounding block for reference sample padding, based on use of a decoder side motion vector refinement (DMVR) during the conversion of the current block; and performing the conversion based on the clipping operation.

In another example aspect, another method of video processing is disclosed. The method includes determining, for a conversion between a current block in a current picture of a video and a coded representation of the video, a clipping operation applied to motion vector calculation according to a bounding block for reference sample padding, based on use of picture wrapping in the conversion; and performing the conversion based on the clipping operation.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 2A-2C show examples of specific positions in a video block.

DETAILED DESCRIPTION

Figure 1:
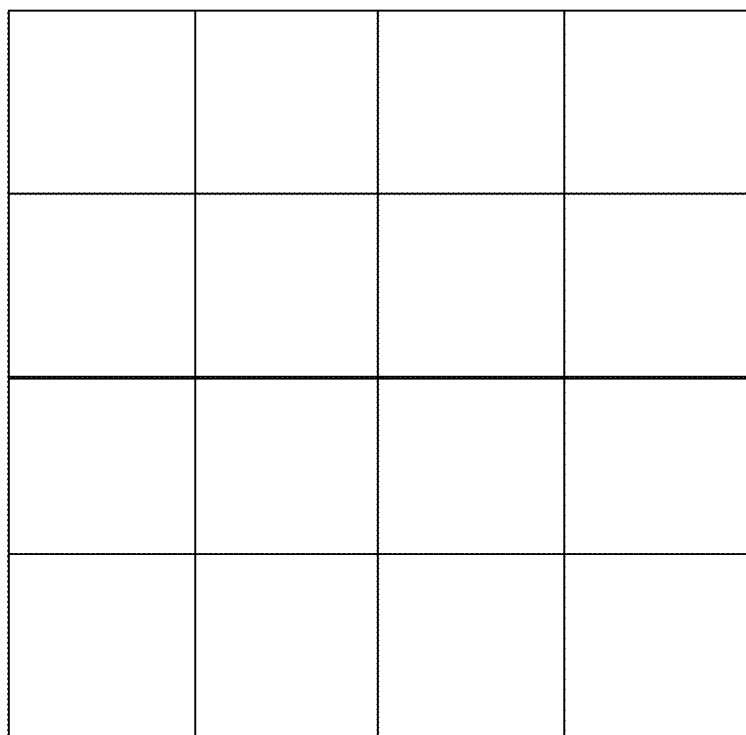
FIG. 1 shows an example of a 16×16 block is divided into 16 4×4 regions.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Initial Discussion

This document is related to video coding technologies. Specifically, it is related to adaptive resolution conversion in video coding. It may be applied to the existing video/image coding standard like HEVC, or the standard (Versatile Video Coding) to be finalized. It may be also applicable to future video coding standards or video codec.

2. Video Coding Introduction

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM) [3][4]. In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

AVC and HEVC does not have the ability to change resolution without having to introduce an IDR or intra random access point (IRAP) picture; such ability can be referred to as adaptive resolution change (ARC). There are use cases or application scenarios that would benefit from an ARC feature, including the following:

Rate adaption in video telephony and conferencing: For adapting the coded video to the changing network conditions, when the network condition gets worse so that available bandwidth becomes lower, the encoder may adapt to it by encoding smaller resolution pictures. Currently, changing picture resolution can be done only after an IRAP picture; this has several issues. An IRAP picture at reasonable quality will be much larger than an inter-coded picture and will be correspondingly more complex to decode: this costs time and resource. This is a problem if the resolution change is requested by the decoder for loading reasons. It can also break low-latency buffer conditions, forcing an audio re-sync, and the end-to-end delay of the stream will increase, at least temporarily. This can give a poor user experience.

Active speaker changes in multi-party video conferencing: For multi-party video conferencing it is common that the active speaker is shown in bigger video size than the video for the rest of conference participants. When the active speaker changes, picture resolution for each participant may also need to be adjusted. The need to have ARC feature becomes more important when such change in active speaker happens frequently.

Fast start in streaming: For streaming application, it is common that the application would buffer up to certain length of decoded picture before start displaying. Start-ing the bitstream with smaller resolution would allow the application to have enough pictures in the buffer to start displaying faster.

Adaptive stream switching in streaming: The Dynamic Adaptive Streaming over HTTP (DASH) specification includes a feature named @mediaStreamStructureId. This enables switching between different representations at open-GOP random access points with non-decodable leading pictures, e.g., CRA pictures with associated RASL pictures in HEVC. When two different representations of the same video have different bitrates but the same spatial resolution while they have the same value of @mediaStreamStructureId, switching between the two representations at a CRA picture with associated RASL pictures can be performed, and the RASL pictures associated with the switching-at CRA pictures can be decoded with acceptable quality hence enabling seamless switching. With ARC, the @mediaStreamStructureId feature would also be usable for switching between DASH representations with different spatial resolutions.

ARC is also known as Dynamic resolution conversion.

ARC may also be regarded as a special case of Reference Picture Resampling (RPR) such as H.263 Annex P.

2.1. Reference Picture Resampling in H.263 Annex P

This mode describes an algorithm to warp the reference picture prior to its use for prediction. It can be useful for resampling a reference picture having a different source format than the picture being predicted. It can also be used for global motion estimation, or estimation of rotating motion, by warping the shape, size, and location of the reference picture. The syntax includes warping parameters to be used as well as a resampling algorithm. The simplest level of operation for the reference picture resampling mode is an implicit factor of 4 resampling as only an FIR filter needs to be applied for the upsampling and downsampling processes. In this case, no additional signaling overhead is required as its use is understood when the size of a new picture (indicated in the picture header) is different from that of the previous picture.

2.2. Contributions on ARC to VVC

Several contributions have been proposed addressing ARC, as listed below:
JVET-M013 5, JVET-M0259, JVET-N0048, JVET-N0052, JVET-N0118, JVET-N0279.

2.3. ARC in JVET-O2001-v14

ARC, a.k.a. RPR (Reference Picture Resampling) is incorporated in JVET-O2001-v14.

With RPR in JVET-O2001-v14, TMVP is disabled if the collocated picture has a different resolution to the current picture. Besides, BDOF and DMVR are disabled when the reference picture has a different resolution to the current picture.

To handle the normal MC when the reference picture has a different resolution than the current picture, the interpolation section is defined as below:
8.5.6.3.1 General
Inputs to this process are:
a luma location (xSb, ySb) specifying the top-left sample of the current coding subblock relative to the top-left luma sample of the current picture, a variable sbWidth specifying the width of the current coding subblock,
a variable sbHeight specifying the height of the current coding subblock,
a motion vector offset mvOffset,
a refined motion vector refMvLX,
the selected reference picture sample array refPicLX,
the half sample interpolation filter index hpelIfIdx,
the bi-directional optical flow flag bdofFlag,
a variable cIdx specifying the colour component index of the current block.
Outputs of this process are:
an (sbWidth+brdExtSize)×(sbHeight+brdExtSize) array predSamplesLX of prediction sample values.
The prediction block border extension size brdExtSize is derived as follows:

brdExtSize=(bdofFlag||(inter_affine_flag[xSb][ySb]
&& sps_affine_prof_enabled_flag))?2:0   (8-752)

The variable fRefWidth is set equal to the PicOutputWidthL of the reference picture in luma samples.
The variable fRefHeight is set equal to PicOutputHeightL of the reference picture in luma samples.
The motion vector mvLX is set equal to (refMvLX−mvOffset).
If cIdx is equal to 0, the following applies:
  The scaling factors and their fixed-point representations are defined as

*hori_scale_fp = ( ( fRefWidth*
  *<< 14 ) + ( PicOutputWidthL*
  *>> 1 ) ) / PicOutputWidthL (8-753)*

*vert_scale_fp = ( ( fRefHeight*
  *<< 14 ) + ( PicOutputHeightL*
  *<< 14 ) + ( PicOutputHeightL (8-754)*

Let (xIntL,yIntL) be a luma location given in full-sample units and (xFracL,yFracL) be an offset given in 1/16-sample units. These variables are used only in this clause for specifying fractional-sample locations inside the reference sample arrays refPicLX.
  The top-left coordinate of the bounding block for reference sample padding (xSbInt$_L$,ySbInt$_L$) is set equal to (xSb+(mvLX[0]>>4),ySb+(mvLX[1]>>4)).
  For each luma sample location (x$_L$=0 . . . sbWidth−1+brdExtSize,y$_L$=0 . . . sbHeight−1+brdExtSize) inside the prediction luma sample array predSamplesLX, the corresponding prediction luma sample value predSamplesLX[x$_L$][y$_L$] is derived as follows:
  - *Let(refxSb$_L$, refySb$_L$) and*
    *(refx$_L$, refy$_L$) be luma locations*
    *pointed to by a motion vector*
    *(refMvLX[0], refMvLX[1])*
    *given in 1/16-sample units.*
    *The variables refxSb$_L$, refx$_L$,*
    *refySb$_L$, and refy$_L$ are derived as follows:*

*refxSb$_L$=((xSb << 4)+*
      *refMvLX[0])*hori_scale_fp   (8-755)*

*refx$_L$=((Sign(refxSb)\**
      *((Abs(refxSb)+128) >> 8)*
      *+x$_L$ *((hori_scale_fp+8)*
      *>>4))+32)>> 6   (8-756)*

*refySb$_L$=((ySb << 4)+refMvLX[*
      *1]) * vert_scale_fp   (8-757)*

*refy$_L$=((sign(refySb)*
  *\*((Abs(refySb)+128 >> 8)+yL\**
  *((vert_scale_fp+8) >> 4))+32) >> 6*
  *(8-758)*

- *The variables xInt$_L$, yInt$_L$,*

*xFrac$_L$ and yFrac$_L$ are derived as follows:*
  *xInt$_L$=refx$_L$ >> 4   (8-759)*

*yInt$_L$=refy$_L$ >> 4   (8-760)*

*xFrac$_L$=refx$_L$ & 15   (8-761)*

*yFrac$_L$=refy$_L$ & 15   (8-762)*

If bdofFlag is equal to TRUE or (sps_affine_prof_enabled_flag is equal to TRUE and inter_affine_flag[xSb][ySb] is equal to TRUE), and one or more of the following conditions are true, the prediction luma sample value predSamplesLX[x$_L$][y$_L$] is derived by invoking the luma integer sample fetching process as specified in clause 8.5.6.3.3 with (xInt$_L$+(xFrac$_L$>>3)−1),yInt$_L$+(yFrac$_L$>>3)−1) and refPicLX as inputs.
  x$_L$ is equal to 0.
  x$_L$ is equal to sbWidth+1.
  y$_L$ is equal to 0.
  y$_L$ is equal to sbHeight+1.
Otherwise, the prediction luma sample value predSamplesLX[xL][yL] is derived by invoking the luma sample 8-tap interpolation filtering process as specified in clause 8.5.6.3.2 with (xIntL−(brdExtSize>0?1:0), yIntL−(brdExtSize>0?1:0)), (xFracL,yFracL), (xSbInt$_L$,ySbInt$_L$), refPicLX, hpelIfIdx, sbWidth, sbHeight and (xSb,ySb) as inputs.
Otherwise (cIdx is not equal to 0), the following applies:
  Let (xIntC,yIntC) be a chroma location given in full-sample units and (xFracC,yFracC) be an offset given in 1/32 sample units. These variables are used only in this clause for specifying general fractional-sample locations inside the reference sample arrays refPicLX.
  The top-left coordinate of the bounding block for reference sample padding (xSbIntC,ySbIntC) is set equal to ((xSb/SubWidthC)+(mvLX[0]>>5), (ySb/SubHeightC)+(mvLX[1]>>5)).
  For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:
  - *Let (refxSb$_C$, refySb$_C$) and (refx$_C$,*
    *refy$_C$) be chroma locations*
    *pointed to by a motion vector*
    *(mvLX[0], mvLX[1]) given in*
    *1/32-sample units. The variables*
    refxSb$_c$, refySb$_c$, refx$_c$
    and refy$_c$ are derived as follows:

refxSb$_c$=((xSb/SubWidthC << 5)
      +MvLX[0])*hori_scale_fp   (8-763)

refx$_c$=((Sign(refxSb$_c$)*
      ((Abs(refxSb$_c$)+256) >> 9)
      +xC*((hori_scale_fp+8)
      >> 4))+16) >> 5   (8-764)

refySb$_c$=((ySb/SubHeightC
      << 5)+mvLX[1])*vert_scale_fp   (8-765)

refy$_c$=((Sign(refySb$_c$)*
      ((Abs(refySb$_c$)+256) >> 9)

```
+yC*((vert_scale_fp+8)
>> 4))+16) >> 5          (8-766)
```

The variables $xInt_C$, $yInt_C$, $xFrac_C$ and $yFrac_C$ are derived as follows:

$$xInt_C = refx_C >> 5 \quad (8\text{-}767)$$

$$yInt_C = refy_C >> 5 \quad (8\text{-}768)$$

$$xFrac_C = refy_C \& 31 \quad (8\text{-}769)$$

$$yFrac_C = refy_C \& 31 \quad (8\text{-}770)$$

The prediction sample value predSamplesLX[xC][yC] is derived by invoking the process specified in clause 8.5.6.3.4 with (xIntC,yIntC), (xFracC,yFracC), (xSbIntC,ySbIntC), sbWidth, sbHeight and refPicLX as inputs.

Luma Sample Interpolation Filtering Process

Inputs to this process are:
a luma location in full-sample units ($xInt_L$,$yInt_L$),
a luma location in fractional-sample units ($xFrac_L$,$yFrac_L$),
a luma location in full-sample units ($xSbInt_L$,$ySbInt_L$) specifying the top-left sample of the bounding block for reference sample padding relative to the top-left luma sample of the reference picture,
the luma reference sample array $refPicLX_L$,
the half sample interpolation filter index hpelIfIdx,
a variable sbWidth specifying the width of the current subblock,
a variable sbHeight specifying the height of the current subblock,
a luma location (xSb,ySb) specifying the top-left sample of the current subblock relative to the top-left luma sample of the current picture, Output of this process is a predicted luma sample value $predSampleLX_L$ The variables shift1, shift2 and shift3 are derived as follows:
The variable shift1 is set equal to Min(4,BitDepth$_Y$−8), the variable shift2 is set equal to 6 and the variable shift3 is set equal to Max(2, 14−BitDepth$_Y$).
The variable picW is set equal to pic_width_in_luma_samples and the variable picH is set equal to pic_height_in_luma_samples.
The luma interpolation filter coefficients $f_L[p]$ for each 1/16 fractional sample position p equal to $xFrac_L$ or $yFrac_L$ are derived as follows:
If MotionModelIdc[xSb][ySb] is greater than 0, and sbWidth and sbHeight are both equal to 4, the luma interpolation filter coefficients $f_L[p]$ are specified in Table 8-12.

Otherwise, the luma interpolation filter coefficients $f_L[p]$ are specified in Table 8-11 depending on hpelIfIdx.

The luma locations in full-sample units ($xInt_i$,$yInt_i$) are derived as follows for i=0..7:
If subpic_treated_as_pic_flag[SubPicIdx] is equal to 1, the following applies:

$$xInt_i = Clip3(SubPicLeftBoundaryPos,SubPicRight-BoundaryPos,xInt_L+i-3) \quad (8\text{-}771)$$

$$yInt_i = Clip3(SubPicTopBoundaryPos,SubPicBot-BoundaryPos,yInt_L+i-3) \quad (8\text{-}772)$$

Otherwise (subpic_treated_as_pic_flag[SubPicIdx] is equal to 0), the following applies:

$$xInt_i = Clip3(0,picW-1,sps\_ref\_wraparound\_enabled\_flag?ClipH((sps\_ref\_wraparound\_offset\_minus1+1)*MinCbSizeY,picW,xInt_L+i-3):$$
$$xInt_L+i-3) \quad (8\text{-}773)$$

$$yInt_i = Clip3(0,picH-1,yInt_L+i-3) \quad (8\text{-}774)$$

The luma locations in full-sample units are further modified as follows for i=0 ... 7:

$$xInt_i = Clip3(xSbInt_L-3,xSbInt_L+sbWidth+4,xInt_i) \quad (8\text{-}775)$$

$$yInt_i = Clip3(ySbInt_L-3,ySbInt_L+sbHeight+4,yInt_i) \quad (8\text{-}776)$$

The predicted luma sample value $predSampleLX_L$ is derived as follows:
If both $xFrac_L$ and $yFrac_L$ are equal to 0, the value of $predSampleLX_L$ is derived as follows:

$$predSampleLX_L = refPicLX_L[xInt_3][yInt_3] << shift3 \quad (8\text{-}777)$$

Otherwise, if $xFrac_L$ is not equal to 0 and $yFrac_L$ is equal to 0, the value of $predSampleLX_L$ is derived as follows:

$$predSampleLX_L = (\Sigma_{i=0}^{7} f_L[xFrac_L][i]*refPicLX_L[xInt_3][yInt_i]) >> shift1 \quad (8\text{-}778)$$

Otherwise, if $xFrac_L$ is equal to 0 and $yFrac_L$ is not equal to 0, the value of $predSampleLX_L$ is derived as follows:

$$predSampleLX_L = (\Sigma_{i=0}^{7} f_L[yFrac_L][i]*refPicLX_L[xInt_3][yInt_i]) >> shift1 \quad (8\text{-}779)$$

Otherwise, if $xFrac_L$ is not equal to 0 and $yFrac_L$ is not equal to 0, the value of $predSampleLX_L$ is derived as follows:
The sample array temp[n] with n=0 ... 7, is derived as follows:

$$temp[n] = (\Sigma_{i=0}^{7} f_L[xFrac_L][i]*refPicLX_L[xInt_i][yInt_n]) >> shift1 \quad (8\text{-}780)$$

The predicted luma sample value $predSampleLX_L$ is derived as follows:

$$predSampleLX_L = (\Sigma_{i=0}^{7} f_L[yFrac_L][i]*temp[i]) >> shift2 \quad (8\text{-}781)$$

TABLE 8-11

Specification of the luma interpolation filter coefficients $f_L[p]$ for each 1/16 fractional sample position p.

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |

TABLE 8-11-continued

Specification of the luma interpolation filter coefficients $f_L[\,p\,]$ for each 1/16 fractional sample position p.

| Fractional sample position p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
|---|---|---|---|---|---|---|---|---|
| 8 (hpelIfIdx == 0) | −1 | 4 | −11 | 40 | 40 | −11 | 4 | −1 |
| 8 (hpelIfIdx == 1) | 0 | 3 | 9 | 20 | 20 | 9 | 3 | 0 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

TABLE 8-12

Specification of the luma interpolation filter coefficients $f_L[\,p\,]$ for each 1/16 fractional sample position p. for affine motion mode.

| Fractional sample position p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
|---|---|---|---|---|---|---|---|---|
| 1 | 0 | 1 | −3 | 63 | 4 | −2 | 1 | 0 |
| 2 | 0 | 1 | −5 | 62 | 8 | −3 | 1 | 0 |
| 3 | 0 | 2 | −8 | 60 | 13 | −4 | 1 | 0 |
| 4 | 0 | 3 | −10 | 58 | 17 | −5 | 1 | 0 |
| 5 | 0 | 3 | −11 | 52 | 26 | −8 | 2 | 0 |
| 6 | 0 | 2 | −9 | 47 | 31 | −10 | 3 | 0 |
| 7 | 0 | 3 | −11 | 45 | 34 | −10 | 3 | 0 |
| 8 | 0 | 3 | −11 | 40 | 40 | −11 | 3 | 0 |
| 9 | 0 | 3 | −10 | 34 | 45 | −11 | 3 | 0 |
| 10 | 0 | 3 | −10 | 31 | 47 | −9 | 2 | 0 |
| 11 | 0 | 2 | −8 | 26 | 52 | −11 | 3 | 0 |
| 12 | 0 | 1 | −5 | 17 | 58 | −10 | 3 | 0 |
| 13 | 0 | 1 | −4 | 13 | 60 | −8 | 2 | 0 |
| 14 | 0 | 1 | −3 | 8 | 62 | −5 | 1 | 0 |
| 15 | 0 | 1 | −2 | 4 | 63 | −3 | 1 | 0 |

Luma Integer Sample Fetching Process
Inputs to this process are:
a luma location in full-sample units ($xInt_L$, $yInt_L$),
the luma reference sample array $refPicLX_L$,
Output of this process is a predicted luma sample value $predSampleLX_L$
The variable shift is set equal to Max(2, 14−$BitDepth_Y$).
The variable picW is set equal to pic_width_in_luma_samples and the variable picH is set equal to pic_height_in_luma_samples.
The luma locations in full-sample units (xInt,yInt) are derived as follows:

$$xInt = Clip3(0, picW-1, sps\_ref\_wraparound\_enabled\_flag\,?\,ClipH((sps\_ref\_wraparound\_offset\_minus1+1)*MinCbSizeY, picW, xInt_L) : xInt_L) \quad (8\text{-}782)$$

$$yInt = Clip3(0, picH-1, yInt_L) \quad (8\text{-}783)$$

The predicted luma sample value $predSampleLX_L$ is derived as follows:

$$predSampleLX_L = refPicLX_L[xInt][yInt] << shift3 \quad (8\text{-}784)$$

Chroma Sample Interpolation Process
Inputs to this process are:
a chroma location in full-sample units ($xInt_C$, $yInt_C$),
a chroma location in 1/32 fractional-sample units ($xFrac_C$, $yFrac_C$),
a chroma location in full-sample units (xSbIntC, ySbIntC) specifying the top-left sample of the bounding block for reference sample padding relative to the top-left chroma sample of the reference picture,
a variable sbWidth specifying the width of the current subblock,
a variable sbHeight specifying the height of the current subblock,
the chroma reference sample array $refPicLX_C$.
Output of this process is a predicted chroma sample value $predSampleLX_C$
The variables shift1, shift2 and shift3 are derived as follows:
The variable shift1 is set equal to Min(4, $BitDepth_C$−8), the variable shift2 is set equal to 6 and the variable shift3 is set equal to Max(2, 14−$BitDepth_C$).
The variable $picW_C$ is set equal to pic_width_in_luma_samples/SubWidthC and the variable $picH_C$ is set equal to pic_height_in_luma_samples/SubHeightC.
The chroma interpolation filter coefficients $f_C[p]$ for each 1/32 fractional sample position p equal to $xFrac_C$ or $yFrac_C$ are specified in Table 8-13.
The variable xOffset is set equal to (sps_ref_wraparound_offset_minus1+1)*MinCbSizeY)/SubWidthC.
The chroma locations in full-sample units ($xInt_i$, $yInt_i$) are derived as follows for i=0 . . . 3:

If subpic_treated_as_pic_flag[SubPicIdx] is equal to 1, the following applies:

xInt$_i$=Clip3(SubPicLeftBoundaryPos/SubWidthC,
  SubPicRightBoundaryPos/SubWidthC,xInt$_L$+i)  (8-785)

yInt$_i$=Clip3(SubPicTopBoundaryPos/SubHeightC,
  SubPicBotBoundaryPos/SubHeightC,yInt$_L$+i)  (8-786)

Otherwise (subpic_treated_as_pic_flag[SubPicIdx] is equal to 0), the following applies:

xInt$_i$=Clip3(0,picW$_C$−1,sps_ref_wraparound_en-
  abled_ flag?ClipH(xOffset,picW$_C$,xInt$_C$+i1):
  xInt$_C$+i1)  (8-787)

yInt$_i$=Clip3(0,picH$_C$−1,yInt$_C$+i1)  (8-788)

The chroma locations in full-sample units (xInt$_i$,yInt$_i$) are further modified as follows for i=0 . . . 3:

xInt$_i$=Clip3(xSbIntC−1,xSbIntC+sbWidth+2,xInt$_i$)  (8-789)

yInt$_i$=Clip3(ySbIntC−1,ySbIntC+sbHeight+2,yInt$_i$)  (8-790)

The predicted chroma sample value predSampleLX$_C$ is derived as follows:
If both xFrac$_C$ and yFrac$_C$ are equal to 0, the value of predSampleLX$_c$ is derived as follows:

predSampleLX$_C$=refPicLX$_C$[xInt$_1$][yInt$_1$]<<shift3  (8-791)

Otherwise, if xFrac$_C$ is not equal to 0 and yFrac$_C$ is equal to 0, the value of predSampleLX$_C$ is derived as follows:

predSampleLX$_C$=($\Sigma_{i=0}^3$f$_C$[xFrac$_C$][i]*refPicLX$_C$
  [xInt$_i$][yInt$_1$])>>shift1  (8-792)

Otherwise, if xFrac$_C$ is equal to 0 and yFrac$_C$ is not equal to 0, the value of predSampleLX$_C$ is derived as follows:

predSampleLX$_C$=($\Sigma_{i=0}^3$f$_C$[yFrac$_C$][i]*refPicLX$_C$
  [yInt$_1$][yInt$_i$])>>shift1  (8-793)

Otherwise, if xFrac$_C$ is not equal to 0 and yFrac$_C$ is not equal to 0, the value of predSampleLX$_C$ is derived as follows:
The sample array temp[n] with n=0 . . . 3, is derived as follows:

temp[n]=($\Sigma_{i=0}^3$f$_C$[xFrac$_C$][i]*refPicLX$_C$[xInt$_i$][yInt$_n$])
  >>shift1  (8-794)

The predicted chroma sample value predSampleLX$_C$ is derived as follows:

predSampleLX$_C$=(f$_C$[yFrac$_C$][0]*temp[0]+f$_C$[yFrac$_C$]
  [1]*temp[1]+f$_C$[yFrac$_C$][2]*temp[2]+  (8-795)

f$_C$[yFrac$_C$][3]*temp[3])>>shift2

TABLE 8-13

Specification of the chroma interpolation filter coefficients
f$_C$[p] for each 1/32 fractional sample position p.

| Fractional sample position p | interpolation filter coefficients | | | |
|---|---|---|---|---|
| | f$_C$[p][0] | f$_C$[p][1] | f$_C$[p][2] | f$_C$[p][3] |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |

TABLE 8-13-continued

Specification of the chroma interpolation filter coefficients
f$_C$[p] for each 1/32 fractional sample position p.

| Fractional sample position p | interpolation filter coefficients | | | |
|---|---|---|---|---|
| | f$_C$[p][0] | f$_C$[p][1] | f$_C$[p][2] | f$_C$[p][3] |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |
| 31 | 0 | 2 | 63 | −1 |

2.4. Wrap-Around Cliping in VVC

Figure 5:
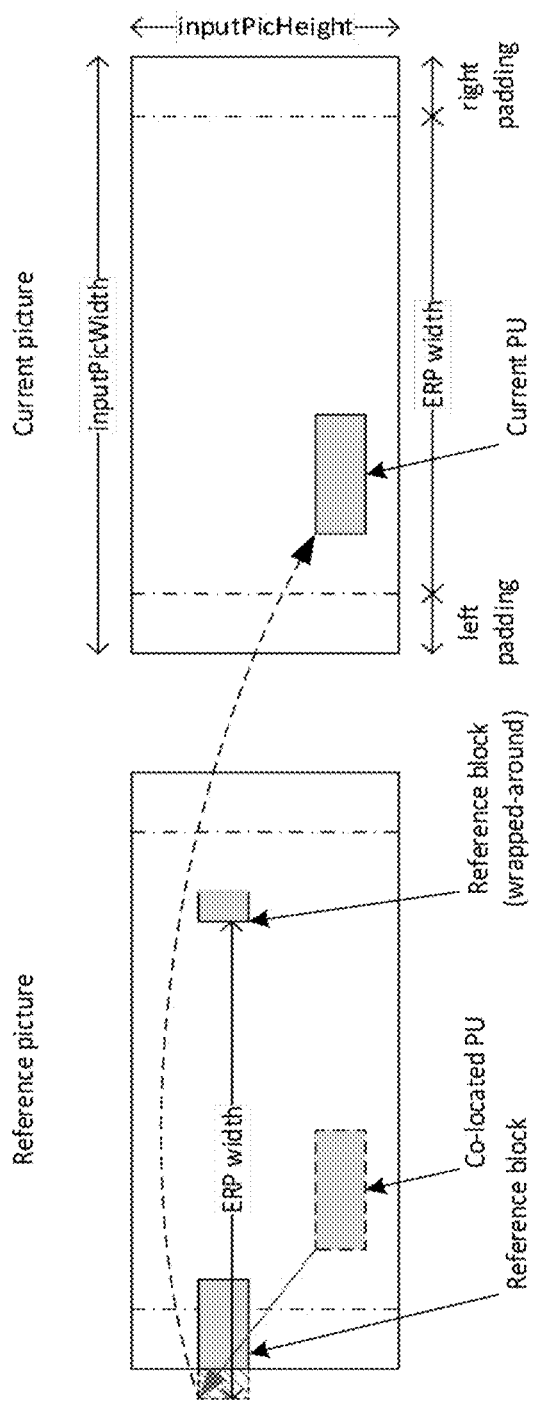
FIG. 5 shows an example of wrap-around clipping in VVC.

Wrap-around clipping was proposed JVET-L0231 to address the ERP or PERP picture format as shown in FIG. 5.

In JVET-P2001-v9, wrap-around clipping is specified that $$ClipH(o, W, x) = \begin{cases} x + o; & x < 0 \\ x - o; & x > W - 1 \\ x; & \text{otherwise} \end{cases}$$

And a horizontal position will be clipped depending on whether wraparound clipping is applied. In JVET-P2001-v9, it is specified as:
The luma locations in full-sample units (xInt$_i$,yInt$_i$) are derived as follows for i=0 . . . 7:
If subpic_treated_as_pic_flag[SubPicIdx] is equal to 1, the following applies:

xInt$_i$=Clip3(SubPicLeftBoundaryPos,SubPicRight-
  BoundaryPos,xInt$_L$+i−3)  (8-754)

yInt$_i$=Clip3(SubPicTopBoundaryPos,SubPicBot-
  BoundaryPos,yInt$_L$+i−3)  (8-755)

Otherwise (subpic_treated_as_pic_flag[SubPicIdx] is equal to 0), the following applies:

xInt$_i$=Clip3(0,picW−1,sps_ref_wraparound_enabled_
  flag?ClipH((sps_ref_wraparound_offset_mi-
  nus1+1)*MinCbSizeY,picW,xInt$_L$+i−3): xInt$_L$+i−
  3)  (8-756)

yInt$_i$=Clip3(0,picH−1,yInt$_L$+i−3)  (8-757)

2.5. CCLM in VVC

Parameters are derived for Cross-Component Linear Model (CCLM) prediction in VVC as specified in JVET-P2001-v9:

8.4.5.2.13 Specification of INTRA_LT_CCLM, INTRA_L_CCLM and INTRA_T_CCLM Intra Prediction Mode 7. The variables a, b, and k are derived as follows:
   If numSampL is equal to 0, and numSampT is equal to 0, the following applies:

k=0     (8-211)

a=0     (8-212)

b=1<<(BitDepth−1)     (8-213)

Otherwise, the following applies:

diff=maxY−minY     (8-214)

If diff is not equal to 0, the following applies:

diffC=maxC−minC     (8-215)

x=Floor(Log 2(diff))     (8-216)

normDiff=((diff<<4)>>x)&15     (8-217)

x+=(normDiff!=0)?1:0     (8-218)

y=Floor(Log 2(Abs(diffC)))+1     (8-219)

$a=(diffC*(divSigTable[normDiff]|8))2^{y-1})>>y$     (8-220)

k=((3+x−y)<1)?1:3+x−y     (8-221)

a=((3+x−y)<1)?Sign(a)*15:a     (8-222)

b=minC−((a*minY)>>k)     (8-223)

where divSigTable[ ] is specified as follows:

divSigTable[ ]={0,7,6,5,5,4,4,3,3,2,2,1,1,1,1,0}     (8-224)

Otherwise (diff is equal to 0), the following applies:

k=0     (8-225)

a=0     (8-226)

b=minC     (8-227)

2.6. Angular Prediction in VVC

Angular prediction in VVC is specified in JVET-P2001-v9 as:

8.4.5.2.12 Specification of INTRA_ANGULAR2 . . . INTRA_ANGULAR66 Intra Prediction Modes Inputs to this process are:
the intra prediction mode predModeIntra,
a variable refIdx specifying the intra prediction reference line index,
a variable nTbW specifying the transform block width,
a variable nTbH specifying the transform block height,
a variable refW specifying the reference samples width,
a variable refH specifying the reference samples height,
a variable nCbW specifying the coding block width,
a variable nCbH specifying the coding block height,
a variable refFilterFlag specifying the value of reference filter flag,
a variable cIdx specifying the colour component of the current block,
the neighbouring samples p[x][y], with x=−1−refIdx, y=−1−refIdx . . . refH−1 and x=−refIdx . . . refW−1, y=−1−refIdx.

Outputs of this process are the predicted samples predSamples[x][y], with x=0 . . . nTbW−1, y=0 . . . nTbH−1.
The variable nTbS is set equal to (Log 2 (nTbW)+Log 2(nTbH))>>1.
The variable filterFlag is derived as follows:
If one or more of the following conditions is true, filterFlag is set equal to 0.
refFilterFlag is equal to 1
refIdx is not equal to 0
IntraSubPartitionsSplitType is not equal to ISP_NO_SPLIT
Otherwise, the following applies:
The variable minDistVerHor is set equal to Min(Abs (predModeIntra−50), Abs(predModeIntra−18)).
The variable intraHorVerDistThres[nTbS] is specified in Table 8-7.
The variable filterFlag is derived as follows:
If minDistVerHor is greater than intraHorVerDistThres [nTbS] and refFilterFlag is equal to 0, filterFlag is set equal to 1.
Otherwise, filterFlag is set equal to 0.

TABLE 8-7

Specification of intraHorVerDistThres[ nTbS ] for various transform block sizes nTbS

| | nTbS = 2 | nTbS = 3 | nTbS = 4 | nTbS = 5 | nTbS = 6 | nTbS = 7 |
|---|---|---|---|---|---|---|
| intraHorVerDistThres[ nTbS ] | 24 | 14 | 2 | 0 | 0 | 0 |

Table 8-8 specifies the mapping table between predModeIntra and the angle parameter intraPredAngle.

TABLE 8-8

Specification of intraPredAngle

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |

TABLE 8-8-continued

Specification of intraPredAngle

| predModeIntra | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

The inverse angle parameter invAngle is derived based on intraPredAngle as follows:

$$invAngle = \text{Round}\left(\frac{512 * 32}{intraPredAngle}\right) \quad (8\text{-}129)$$

2.7. Sample Fetching for Inter-Prediction in VVC 8.5.6.3.2 Luma Sample Interpolation Filtering Process
The luma locations in full-sample units ($xInt_i, yInt_i$) are derived as follows for i=0 ... 7:
If subpic_treated_as_pic_flag[SubPicIdx] is equal to 1, the following applies:

$xInt_i$=Clip3(SubPicLeftBoundaryPos,SubPicRight-
BoundaryPos,$xInt_L$+i−3) (8-754)

$yInt_i$=Clip3(SubPicTopBoundaryPos,SubPicBot-
BoundaryPos,$yInt_L$+i−3) (8-755)

Otherwise (subpic_treated_as_pic_flag[SubPicIdx] is equal to 0), the following applies:

$xInt_i$=Clip3(0,picW−1,sps_ref_wraparound_enabled_
flag?ClipH((sps_ref_wraparound_offset_mi-
nus1+1)*MinCbSizeY,picW,$xInt_L$+i−3): $xInt_L$+i−3)

$yInt_i$=Clip3(0,picH−1,$yInt_L$+i−3)

The luma locations in full-sample units are further modified as follows for i=0 ... 7:

$xInt_i$=Clip3($xSbInt_L$−3,$xSbInt_L$+sbWidth+4,$xInt_i$)

$yInt_i$=Clip3($ySbInt_L$3,$ySbInt_L$+sbHeight+4,$yInt_i$)

The predicted luma sample value predSampleLX$_L$ is derived as follows:
If both xFrac$_L$ and yFrac$_L$ are equal to 0, and both hori_scale_fp and vert_scale_fp are less than 20481, the value of predSampleLX$_L$ is derived as follows:

predSampleLX$_L$=refPicLX$_L$[$xInt_3$][$yInt_3$]<<shift3

8.5.6.3.4 Chroma Sample Interpolation Process
The chroma locations in full-sample units ($xInt_i, yInt_i$) are further modified as follows for i=0 ... 3:

$xInt_i$=Clip3(xSbIntC−1,xSbIntC+sbWidth+2,$xInt_i$) (8-774)

$yInt_i$=Clip3(ySbIntC−1,ySbIntC+sbHeight+2,$yInt_i$) (8-775)

3. Examples of Technical Problems Solved by Disclosed Technical Solutions

When RPR is applied in VVC, RPR (ARC) may have the following problems:
1. With RPR, the interpolation filters may be different for adjacent samples in a block, which is undesirable in SIMD (Single Instruction Multiple Data) implementation.
2. The bounding region does not consider RPR.
3. Wrap-around offset (sps_ref_wraparound_offset_minus1) is signaled in sequence level, but the dimensions of pictures may vary due to RPR in the sequence.
4. Abs (diffC) may be equal to 0 in Log 2(Abs(diffC)) to derive parameters for CCLM.
5. intraPredAngle may be 0, making invAngle meaningless.
6. The highlighten clipping operation described in section 2.7 (denoted as "the integer sample clipping operation") may damage the motion compensation for RPR.

4. A Listing of Embodiments and Techniques

The list below should be considered as examples to explain general concepts. These items should not be interpreted in a narrow way. Furthermore, these items can be combined in any manner.

Figure 2B:
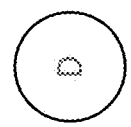
Figure 2B:
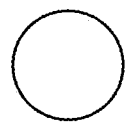
Figure 2B:
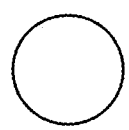
Figure 2B:
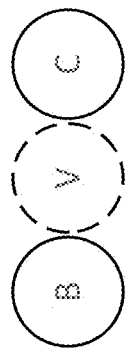
Figure 2B:
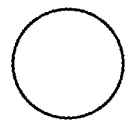
Figure 2B:
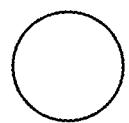
Figure 2B:
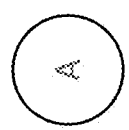
Figure 2C:

A motion vector is denoted by (mv_x,mv_y) wherein mv_x is the horizontal component and mv_y is the vertical component.
1. When the resolution of the reference picture is different to the current picture, predicted values for a group of samples (at least two samples) of a current block may be generated with the same horizontal and/or vertical interpolation filter.
   a. In one example, the group may comprise all samples in a region of the block.
      i. For example, a block may be divided into S M×N rectangles not overlapped with each other. Each M×N rectangle is a group. In an example as shown in FIG. 1, a 16×16 block can be divided into 16 4×4 rectangles, each of which is a group.
      ii. For example, a row with N samples is a group. N is an integer no larger than the block width. In one example, N is 4 or 8 or the block width.
      iii. For example, a column with N samples is a group. N is an integer no larger than the block height. In one example, N is 4 or 8 or the block height.
      iv. M and/or N may be pre-defined or derived on-the-fly, such as based on block dimension/coded information or signaled.
   b. In one example, samples in the group may have the same MV (denoted as shared MV).
   c. In one example, samples in the group may have MVs with the same horizontal component (denoted as shared horizontal component).
   d. In one example, samples in the group may have MVs with the same vertical component (denoted as shared vertical component).
   e. In one example, samples in the group may have MVs with the same fractional part of the horizontal component (denoted as shared fractional horizontal component).
      i. For example, suppose the MV for a first sample is (MV1x,MV1y) and the MV for a second sample is (MV2x,MV2y), it should be satisfied that MV1x & $(2^M-1)$ is equal to MV2x & $(2^M-1)$, where M denotes MV precision. For example, M=4.
f. In one example, samples in the group may have MVs with the same fractional part of the vertical component (denoted as shared fractional vertical component).
  i. For example, suppose the MV for a first sample is (MV1x,MV1y) and the MV for a second sample is (MV2x,MV2y), it should be satisfied that MV1y & $(2^M-1)$ is equal to MV2y & $(2^M-1)$, where M denotes MV precision. For example, M=4.
g. In one example, for a sample in the group to be predicted, the motion vector, denoted by $MV_b$, may be firstly derived according to the resolutions of the current picture and the reference picture (e.g. ($refx_L$, $refy_L$) derived in 8.5.6.3.1 in JVET-O2001-v14). Then, $MV_b$ may be further modified (e.g., being rounded/truncated/clipped) to MV' to satisfy the requirements such as the above bullets, and MV' will be used to derive the prediction sample for the sample.
  i. In one example, MV' has the same integer part as $MV_b$, and the fractional part of the MV' is set to be the shared fractional horizontal and/or vertical component.
  ii. In one example, MV' is set to be the one with the shared fractional horizontal and/or vertical component, and closest to $MV_b$.
h. The shared motion vector (and/or shared horizontal component and/or shared vertical component and/or shared fractional vertical component and/or shared fractional vertical component) may be set to be the motion vector (and/or horizontal component and/or vertical component and/or fractional vertical component and/or fractional vertical component) of a specific sample in the group.
  i. For example, the specific sample may be at a corner of a rectangle-shaped group, such as "A", "B", "C" and "D" shown in FIG. 2A.
  ii. For example, the specific sample may be at a center of a rectangle-shaped group, such as "E", "F", "G" and "H" shown in FIG. 2A.
  iii. For example, the specific sample may be at an end of a row-shaped or column-shaped group, such as "A" and "D" shown in FIGS. 2B and 2C.
  iv. For example, the specific sample may be at a middle of a row-shaped or column-shaped group, such as "B" and "C" shown in FIGS. 2B and 2C.
  v. In one example, the motion vector of the specific sample may be the $MV_b$ mentioned in bullet g.
i. The shared motion vector (and/or shared horizontal component and/or shared vertical component and/or shared fractional vertical component and/or shared fractional vertical component) may be set to be the motion vector (and/or horizontal component and/or vertical component and/or fractional vertical component and/or fractional vertical component) of a virtual sample located at a different position compared to all samples in this group.
  i. In one example, the virtual sample is not in the group, but it locates in the region covering all samples in the group.
    1) Alternatively, the virtual sample is located outside the region covering all samples in the group, e.g., next to the bottom-right position of the region.
  ii. In one example, the MV of a virtual sample is derived in the same way as a real sample but with different positions.
  iii. "V" in FIGS. 2A-2C shows three examples of virtual samples.
j. The shared MV (and/or shared horizontal component and/or shared vertical component and/or shared fractional vertical component and/or shared fractional vertical component) may be set to be a function of MVs (and/or horizontal components and/or vertical components and/or fractional vertical components and/or fractional vertical components) of multiple samples and/or virtual samples.
  i. For example, the shared MV (and/or shared horizontal component and/or shared vertical component and/or shared fractional vertical component and/or shared fractional vertical component) may be set to be the average of MVs (and/or horizontal components and/or vertical components and/or fractional vertical components and/or fractional vertical components) of all or partial of samples in the group, or of sample "E", "F", "G", "H" in FIG. 2A, or of sample "E", "H" in FIG. 2A or of sample "A", "B", "C", "D" in FIG. 2A, or of sample "A", "D" in FIG. 2A, or of sample "B", "C" in FIG. 2B, or of sample "A", "D" in FIG. 2B, or of sample "B", "C" in FIG. 2C, or of sample "A", "D" in FIG. 2C, 2. It is proposed that only integer MVs are allowed to perform the motion compensation process to derive the prediction block of a current block when the resolution of the reference picture is different to the current picture.
  a. In one example, the decoded motion vectors for samples to be predicted are rounded to integer MVs before being used.

3. The motion vectors used in the motion compensation process for samples in a current block (e.g., shared MV shared horizontal or vertical or fractional component/ MV' mentioned in above bullets) may be stored in the decoded picture buffer and utilized for motion vector prediction of succeeding blocks in current/different pictures.
  a. Alternatively, the motion vectors used in the motion compensation process for samples in a current block (e.g., shared MV/shared horizontal or vertical or fractional component/MV' mentioned in above bullets) may be disallowed to be utilized for motion vector prediction of succeeding blocks in current/ different pictures.
    i. In one example, the decoded motion vectors (e.g., $MV_b$ in above bullets) may be utilized for motion vector prediction of succeeding blocks in current/ different pictures.
  b. In one example, the motion vectors used in the motion compensation process for samples in a current block may be utilized in the filtering process (e.g., deblocking filter/SAO/ALF).
    i. Alternatively, the decoded motion vectors (e.g., $MV_b$ in above bullets) may be utilized in the filtering process.

4. It is proposed that the interpolation filters used in the motion compensation process to derive the prediction block of a current block may be selected depending on whether the resolution of the reference picture is different to the current picture.

a. In one example, the interpolation filters have less taps when the resolution of the reference picture is different to the current picture.
    i. In one example, bi-linear filters are applied when the resolution of the reference picture is different to the current picture.
    ii. In one example, 4-tap filters or 6-tap filters are applied when the resolution of the reference picture is different to the current picture.
5. It is proposed that a two-stage process for prediction block generation is applied when the resolution of the reference picture is different to the current picture.
    a. In the first stage, a virtual reference block is generated by up-sampling or down-sampling a region in the reference picture depending on width and/or height of the current picture and the reference picture.
    b. In the second stage, the prediction samples are generated from the virtual reference block by applying interpolation filtering, independent of width and/or height of the current picture and the reference picture.
6. It is proposed that the calculation of top-left coordinate of the bounding block for reference sample padding (xSbInt$_L$,ySbInt$_L$) as defined in 8.5.6.3.1 in JVET-O2001-v14 may be derived depending on width and/or height of the current picture and the reference picture.
    a. In one example, the luma locations in full-sample units are modified as:

xInt$_i$=Clip3(xSbInt$_L$−Dx,xSbInt$_L$+sbWidth+Ux,xInt$_i$), yInt$_i$=Clip3(ySbInt$_L$−Dy,ySbInt$_L$+sbHeight+Uy,yInt$_i$), where Dx and/or Dy and/or Ux and/or Uy may depend on width and/or height of the current picture and the reference picture.
    b. In one example, the chroma locations in full-sample units are modified as:

xInti=Clip3(xSbInt$_C$−Dx,xSbInt$_C$+sbWidth+Ux,xInti)

yInti=Clip3(ySbInt$_C$−Dy,ySbInt$_C$+sbHeight+Uy,yInti)

where Dx and/or Dy and/or Ux and/or Uy may depend on width and/or height of the current picture and the reference picture.
7. It is proposed that whether to and/or how to clip MV according to the bounding block for reference sample padding (e.g., the (xSbInt$_L$,ySbInt$_L$) as defined in 8.5.6.3.1 in JVET-O2001-v14) may depend on the usage of DMVR.
    a. In one example, MV is clipped according to the bounding block for reference sample padding (e.g., (xSbInt$_L$,ySbInt$_L$) as defined in 8.5.6.3.1) only when DMVR is applied.
        i. For example, operations 8-775 and 8-776 in the luma sample interpolation filtering process as defined in JVET-O2001-v14 are applied only if DMVR is used for the current block.
        ii. For example, operations 8-789 and 8-790 in the chroma sample interpolation filtering process as defined in JVET-O2001-v14 are applied only if DMVR is used for the current block.
    b. Alternatively, furthermore, the above methods may be also applicable to the clipping of chroma samples.
8. It is proposed that whether to and/or how to clip MV according to the bounding block for reference sample padding (e.g., (xSbInt$_L$,ySbInt$_L$) as defined in 8.5.6.3.1 in JVET-O2001-v14) may depend on whether picture wrapping is used (e.g. whether sps_ref_wraparound_enabled_flag is equal to 0 or 1).
    a. In one example, MV is clipped according to the bounding block for reference sample padding (e.g., (xSbInt$_L$,ySbInt$_L$) as defined in 8.5.6.3.1) only if picture wrapping is not used.
        i. For example, operations 8-775 and 8-776 in the luma sample interpolation filtering process as defined in JVET-O2001-v14 are applied only if picture wrapping is not used.
        ii. For example, operations 8-789 and 8-790 in the chroma sample interpolation filtering process as defined in JVET-O2001-v14 are applied only if picture wrapping is not used.
    b. Alternatively, furthermore, the above methods may be also applicable to the clipping of chroma samples.
    c. In one example, the luma locations in full-sample units are modified as:

xInt$_i$=Clip3(xSbInt$_L$−Dx,xSbInt$_L$+sbWidth+Ux,xInt$_i$), yInt$_i$=Clip3(ySbInt$_L$−Dy,ySbInt$_L$+sbHeight+Uy,yInt$_i$), where Dx and/or Dy and/or Ux and/or Uy may depend on whether picture wrapping is used.
    d. In one example, the chroma locations in full-sample units are modified as:

xInti=Clip3(xSbInt$_C$−Dx,xSbInt$_C$+sbWidth+Ux,xInti)

yInti=Clip3(ySbInt$_C$−Dy,ySbInt$_C$+sbHeight+Uy,yInti)

where Dx and/or Dy and/or Ux and/or Uy may depend on whether picture wrapping is used.
9. Whether to/how to apply filtering process (e.g., deblocking filter) may depend on whether the reference pictures are with different resolutions.
    a. In one example, the boundary strength settings in the deblocking filters may take the resolution differences into consideration in addition to motion vector differences.
    b. In one example, the boundary strength settings in the deblocking filters may the scaled motion vector differences based on resolution differences.
    c. In one example, the strength of deblocking filter is increased if the resolution of at least one reference picture of block A is different to (or smaller than or larger than) the resolution of at least one reference picture of block B.
    d. In one example, the strength of deblocking filter is decreased if the resolution of at least one reference picture of block A is different to (or smaller than or larger than) the resolution of at least one reference picture of block B.
    e. In one example, the strength of deblocking filter is increased if the resolution of at least one reference picture of block A and/or block B is different to (or smaller than or larger than) the resolution of the current block.
    f. In one example, the strength of deblocking filter is decreased if the resolution of at least one reference picture of block A and/or block B is different to (or smaller than or larger than) the resolution of the current block.
10. Instead of storing/using the motion vectors for a block based on the same reference picture resolution as current picture, it is proposed to use the real motion vectors with the resolution difference taken into consideration.

a. Alternatively, furthermore, when using the motion vector to generate the prediction block, there is no need to further change the motion vector according to the resolutions of the current picture and the reference picture (e.g. ($refx_L$,$refy_L$) derived in 8.5.6.3.1 in JVET-O2001-v14).
11. In one example, when a sub-picture exists, the reference picture must have the same resolution as the current picture.
   a. Alternatively, when a reference picture has a different resolution to the current picture, there must be no sub-picture in the current picture.
12. In one example, sub-pictures may be defined separately for pictures with different resolutions.
13. In one example, the corresponding sub-picture in the reference picture can be derived by scaling and/or offsetting a sub-picture of the current picture, if the reference picture has a different resolution to the current picture.
14. It is proposed that all or partial information associated with wrap-around clipping may be signaled in a video unit other than at sequence level, such as at picture/view/slice/tile/brick/Sub-picture/CTU row level etc. al.
   a. In one example, the information may be signaled in PPS, APS, picture header, slice header, etc.
   b. For example, a syntax element (e.g., named as pps_ref_wraparound_offset_minus1) may be signaled in a first PPS to indicate the offset used for computing the horizontal wrap-around position.
      i. In one example, pps_ref_wraparound_offset_minus1 may be signaled and pps_ref_wraparound_offset_minus1 plus 1 specifies the offset used for computing the horizontal wrap-around position in units of MinCbSizeY luma samples wherein MinCbSizeY represents the smallest Cb size of luma blocks.
      ii. The range of pps_ref_wraparound_offset_minus1 may depend on pic_width_in_luma_samples is in the first PPS. For example, the value of pps_ref_wraparound_offset_minus1 shall be in the range of (CtbSizeY/MinCbSizeY)+1 to (pic_width_in_luma_samples/MinCbSizeY)−1, inclusive, where pic_width_in_luma_samples is in the first PPS.
      iii. In one example, the syntax element may be coded with fixed length/truncated unary/unary/truncated binary/K-th EG (e.g., K=0) binarization method.
   c. For example, a syntax element (e.g., named as pps_ref_wraparound_enabled_flag) may be signaled in a first PPS to indicate whether horizontal wrap-around motion compensation is applied in inter prediction.
      i. In one example, pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied.
      ii. Alternatively, furthermore, the syntax element may be conditionally signaled.
         1) In one example, whether to signal pps_ref_wraparound_offset_minus1 may depend on pps_ref_wraparound_enabled_flag.
            a) For example, pps_ref_wraparound_offset_minus1 is signaled only if pps_ref_wraparound_enabled_flag is equal to 1.
   d. In one example, a first syntax element may be signaled in a first video unit such as at sequence level (e.g., signaled in SPS), and a second syntax element may be signaled in a second video unit such as at picture/slice level (e.g., signaled in PPS, APS, picture header, slice header, etc). The first syntax element and the second syntax element may have the same functionality on wrap-around clipping but at different levels.
      i. The second video unit may refer to the first video unit.
      ii. For example, sps_ref_wraparound_offset_minus1 may be signaled in SPS and pps_ref_wraparound_offset_minus1 may be signaled in PPS.
      iii. For example, sps_ref_wraparound_enabled_flag may be signaled in SPS and pps_ref_wraparound_enabled_flag may be signaled in PPS.
      iv. In one example, in a conformance bit-stream, the first syntax element should be identical to the second syntax element.
         1) For example, in a conformance bit-stream, sps_ref_wraparound_enabled_flag should be equal to pps_ref_wraparound_enabled_flag.
      v. In one example, the second syntax element may depend on the first syntax element.
         1) For example, pps_ref_wraparound_enabled_flag must be 0 if sps_ref_wraparound_enabled_flag is 0.
         2) For example, pps_ref_wraparound_enabled_flag can 0 or 1 if sps_ref_wraparound_enabled_flag is 1.
      vi. In one example, the first syntax element is ignored, and the second syntax element takes the functionality if the two syntax elements both appear.
      vii. In one example, the second syntax element is ignored, and the first syntax element takes the functionality if the two syntax elements both appear.
   e. In one example, when the value of (CtbSizeY/MinCbSizeY+Offset1) is not less than or equal to (pic_width_in_luma_samples/MinCbSizeY−Offset2), where pic_width_in_luma_samples is the value of pic_width_in_luma_samples in any PPS that refers to the SPS, the value of sps_ref_wraparound_enabled_flag shall be equal to 0. E.g. Offset1=Offset2=1.
   f. In one example, when the value of (CtbSizeY/MinCbSizeY+Offset1) is not less than (pic_width_in_luma_samples/MinCbSizeY−Offset2), where pic_width_in_luma_samples is the value of pic_width_in_luma_samples in any PPS that refers to the SPS, the value of sps_ref_wraparound_enabled_flag shall be equal to 0. E.g. Offset1=Offset2=1.
   g. In one example, when the value of (CtbSizeY/MinCbSizeY+Offset1) is greater than or equal to (pic_width_in_luma_samples/MinCbSizeY−Offset2), where pic_width_in_luma_samples is the value of pic_width_in_luma_samples in any PPS that refers to the SPS, the value of sps_ref_wraparound_enabled_flag shall be equal to 0. E.g. Offset1=Offset2=1.
   h. In one example, when the value of (CtbSizeY/MinCbSizeY+Offset1) is greater than (pic_width_in_luma_samples/MinCbSizeY−Offset2), where pic_width_in_luma_samples is the value of pic_width_in_luma_samples in any PPS that refers to the SPS, the value of sps_ref_wraparound_enabled_flag shall be equal to 0. E.g. Offset1=Offset2=1.
  i. In one example, when the value of (CtbSizeY/MinCbSizeY+Offset1) is not less than or equal to (pic_width_in_luma_samples/MinCbSizeY−Offset2), where pic_width_in_luma_samples is in PPS the value of pps_ref_wraparound_enabled_flag shall be equal to 0. E.g. Offset1=Offset2=1.
  j. In one example, when the value of (CtbSizeY/MinCbSizeY+Offset1) is not less than (pic_width_in_luma_samples/MinCbSizeY−Offset2), where pic_width_in_luma_samples is in PPS the value of pps_ref_wraparound_enabled_flag shall be equal to 0. E.g. Offset1=Offset2=1.
  k. In one example, when the value of (CtbSizeY/MinCbSizeY+Offset1) is greater than or equal to (pic_width_in_luma_samples/MinCbSizeY−Offset2), where pic_width_in_luma_samples is in PPS the value of pps_ref_wraparound_enabled_flag shall be equal to 0. E.g. Offset1=Offset2=1.
  l. In one example, when the value of (CtbSizeY/MinCbSizeY+Offset1) is greater than (pic_width_in_luma_samples/MinCbSizeY−Offset2), where pic_width_in_luma_samples is in PPS the value of pps_ref_wraparound_enabled_flag shall be equal to 0. E.g. Offset1=Offset2=1.

15. It is proposed that an equation of Log 2(X) with X equal to or less than 0 should be avoided to derive the affine merge candidates.
  a. For example, the procedure may be conditioned on whether X is larger than 0 or not.
  b. For example, the procedure may be conditioned on whether X is equal to 0 or not.
  c. For example, Log 2(Height)−Log 2(Width) are calculated instead of Log 2(Height/Width)
  d. An exemplary spec change based on JVET-P2001-v9 is as below: (text is double square brackets is deleted, bold faced italics text is added to the codec specification)

8.5.5.6 Derivation Process for Constructed Affine Control Point Motion Vector Merging Candidates 6. When availableFlagCorner[0] is equal to TRUE and availableFlagCorner[2] is equal to TRUE, the following applies:
  For X being replaced by 0 or 1, the following applies:
    The variable availableFlagLX is derived as follows:
      If all of following conditions are TRUE, availableFlagLX is set equal to TRUE:
        predFlagLXCorner[0] is equal to 1
        predFlagLXCorner[2] is equal to 1
        refIdxLXCorner[0] is equal to refIdxLXCorner[2]
      Otherwise, availableFlagLX is set equal to FALSE.
    When availableFlagLX is equal to TRUE, the following applies:
      The second control point motion vector cpMvLXCorner[1] is derived as follows:

cpMvLXCorner[1][0]=(cpMvLXCorner[0][0]<<7)+
  ((cpMvLXCorner[2][1]−cpMvLXCorner[0][1])  (8-625)

<<(7 + *Log2(cbHeight) - Log2(cbWidth)* [[*Log2(cbHeight/cbWidth)*]]))

cpMvLXCorner[1][1]=(cpMvLXCorner[0][1]<<7)+
  ((cpMvLXCorner[2][0]−cpMvLXCorner[0][0])  (8-626)

(7+*Log2(cbHeight)-Log2(cbWidth)*
[[*Log2(cbHeight/cbWidth)*]]))

The rounding process for motion vectors as specified in clause 8.5.2.14 is invoked with mvX set equal to cpMvLXCorner[1], rightShift set equal to 7, and leftShift set equal to 0 as inputs and the rounded cpMvLXCorner[1] as output.
The following assignments are made:

predFlagLXConst6=1  (8-627)

refIdxLXConst6=refIdxLXCorner[0]  (8-628)

cpMvLXConst6[0]=cpMvLXCorner[0]  (8-629)

cpMvLXConst6[1]=cpMvLXCorner[1]  (8-630)

cpMvLXConst6[0][0]=Clip3($-2^{17}$,$2^{17}-1$,cpMvLXConst6[0][0])  (8-631)

cpMvLXConst6[0][1]=Clip3($-2^{17}$,$2^{17}-1$,cpMvLXConst6[0][1])  (8-632)

cpMvLXConst6[1][0]=Clip3($-2^{17}$,$2^{17}-1$,cpMvLXConst6[1][0])  (8-633)

cpMvLXConst6[1][1]=Clip3($-2^{17}$,$2^{17}-1$,cpMvLXConst6[1][1])  (8-634)

The bi-prediction weight index bcwIdxConst6 is set equal to bcwIdxCorner[0].
The variables availableFlagConst6 and motionModelIdcConst6 are derived as follows:
  If availableFlagL0 or availableFlagL1 is equal to 1, availableFlagConst6 is set equal to TRUE and motionModelIdcConst6 is set equal to 1.
Otherwise, availableFlagConst6 is set equal to FALSE and motionModelIdcConst6 is set equal to 0.

16. It is proposed that an equation of Log 2(X) with X equal to or less than 0 should be avoided in the procedure to derive the parameters in Cross-Component Linear Model (CCLM).
  a. For example, the procedure may be conditioned on whether X is larger than 0 or not.
  b. For example, the procedure may be conditioned on whether X is equal to 0 or not.
  c. An exemplary spec change based on JVET-P2001-v9 is as below:

8.4.5.2.13 Specification of INTRA_LT_CCLM, INTRA_L_CCLM and INTRA_T_CCLM Intra Prediction Mode 7. The variables a, b, and k are derived as follows:
  If numSampL is equal to 0, and numSampT is equal to 0, the following applies:

k=0  (8-211)

a=0  (8-212)

b=1<<(BitDepth−1)  (8-213)

Otherwise, the following applies:

diff=maxY−minY  (8-214)

If diff is not equal to 0, the following applies:

diffC=maxC−minC  (8-215)

x=Floor(Log 2(diff))  (8-216)

normDiff=((diff<<4)>>x)&15  (8-217)

x+=(normDiff!=0)?1:0  (8-218)

$y = diffC > 0 ? Floor(Log\ 2(Abs(diffC))) + 1 : 0$ (8-219)

$a = (diffC * (divSigTable[normDiff] | 8) + 2^{y-1}) >> y$ (8-220)

$k = ((3+x-y)<1) ? 1 : 3+x-y$ (8-221)

$a = ((3+x-y)<1) ? Sign(a) * 15 : a$ (8-222)

$b = minC - ((a * minY) >> k)$ (8-223)

where divSigTable[ ] is specified as follows:

$divSigTable[\ ] = \{0,7,6,5,5,4,4,3,3,2,2,1,1,1,1,0\}$ (8-224)

Otherwise (diff is equal to 0), the following applies:

$k = 0$ (8-225)

$a = 0$ (8-226)

$b = minC$ (8-227)

17. It is proposed that dividing by 0 should be avoided in the procedure of angular intra-prediction.
   d. For example, the derivation of invAngle may be conditioned on whether intraPredAngle is equal to 0 or not.
   e. An exemplary spec change based on JVET-P2001-v9 is as below:

8.4.5.2.12 Specification of INTRA_ANGULAR2 . . . INTRA_ANGULAR66 Intra Prediction Modes
Inputs to this process are:
the intra prediction mode predModeIntra,
a variable refIdx specifying the intra prediction reference line index,
a variable nTbW specifying the transform block width,
a variable nTbH specifying the transform block height,
a variable refW specifying the reference samples width,
a variable refH specifying the reference samples height,
a variable nCbW specifying the coding block width,
a variable nCbH specifying the coding block height,
a variable refFilterFlag specifying the value of reference filter flag,
a variable cIdx specifying the colour component of the current block,
the neighbouring samples p[x][y], with x=−1−refIdx, y=−1−refIdx . . . refH−1 and x=−refIdx . . . refW−1, y=−1−refIdx.

Outputs of this process are the predicted samples predSamples[x][y], with x=0 . . . nTbW−1, y=0 . . . nTbH−1.
The variable nTbS is set equal to (Log 2 (nTbW)+Log 2 (nTbH))>>1.
The variable filterFlag is derived as follows:
If one or more of the following conditions is true, filterFlag is set equal to 0.
   refFilterFlag is equal to 1
   refIdx is not equal to 0
   IntraSubPartitionsSplitType is not equal to ISP_NO_SPLIT
Otherwise, the following applies:
   The variable minDistVerHor is set equal to Min(Abs (predModeIntra−50), Abs(predModeIntra−18)).
   The variable intraHorVerDistThres[nTbS] is specified in Table 8-7.
   The variable filterFlag is derived as follows:
      If minDistVerHor is greater than intraHorVerDistThres [nTbS] and refFilterFlag is equal to 0, filterFlag is set equal to 1.
      Otherwise, filterFlag is set equal to 0.

TABLE 8-7

Specification of intraHorVerDistThres[ nTbS ]for various transform block sizes nTbS

| | nTbS = 2 | nTbS = 3 | nTbS = 4 | nTbS = 5 | nTbS = 6 | nTbS = 7 |
|---|---|---|---|---|---|---|
| intraHorVerDistThres[ nTbS ] | 24 | 14 | 2 | 0 | 0 | 0 |

Table 8-8 specifies the mapping table between predModeIntra and the angle parameter intraPredAngle.

TABLE 8-8

Specification of intraPredAngle

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

The inverse angle parameter invAngle is derived based on intraPredAngle as follows:

$$invAngle = intraPredAngle == 0 \; ? \; 0 : \text{Round}\left(\frac{512*32}{intraPredAngle}\right)$$

18. Whether and/or how to apply the integer sample clipping operation on luma and/or chroma samples may depend on the width and/or height of the reference picture (or its conformance window, or its scaling window), and the width and/or height of the current picture (or its conformance window, or its scaling window).
    a. In one example, the integer sample clipping operation is applied only if the width and/or height of the reference picture (or its conformance window, or its scaling window) is equal to width and/or height of the current picture (or its conformance window, or its scaling window).
        i. Alternatively, furthermore, if either width or height of the reference picture (or its conformance window, or its scaling window) is unequal to that of the current picture (or its conformance window, or its scaling window), the integer sample clipping operation is skipped.
    b. Alternatively, whether and/or how to apply the integer sample clipping operation on luma and/or chroma samples may depend on the horizontal and/or vertical scaling factor between the reference picture (or its conformance window, or its scaling window) and that of the current picture (or its conformance window, or its scaling window).
        i. In one example, the integer sample clipping operation is applied only if the horizontal and/or vertical scaling factor between the reference picture (or its conformance window, or its scaling window) and that of the current picture (or its conformance window, or its scaling window) is equal to 1.
        ii. Alternatively, if the horizontal or vertical scaling factor is unequal to 1, the integer sample clipping operation is skipped.
    c. In one example, the integer sample clipping operation on horizontal direction is conditioned by the width of the reference picture (or its conformance window, or its scaling window) and the width of the current picture (or its conformance window, or its scaling window).
        i. In one example, the integer sample clipping operation on horizontal direction is conditioned by the horizontal scaling factor between the reference picture (or its conformance window, or its scaling window) and that of the current picture (or its conformance window, or its scaling window).
    d. In one example, the integer sample clipping operation on vertical direction is conditioned by the height of the reference picture (or its conformance window, or its scaling window) and the height of the current picture (or its conformance window, or its scaling window).
        i. In one example, the integer sample clipping operation on vertical direction is conditioned by the vertical scaling factor between the reference picture (or its conformance window, or its scaling window) and that of the current picture (or its conformance window, or its scaling window).

e. An exemplary spec change based on JVET-P2001-v9 is as below:
8.5.6.3.2 Luma Sample Interpolation Filtering Process
The luma locations in full-sample units ($xInt_i, yInt_i$) are derived as follows for i=0 . . . 7:
If subpic_treated_as_pic_flag[SubPicIdx] is equal to 1, the following applies:

$xInt_i$=Clip3(SubPicLeftBoundaryPos,SubPicRight-
    BoundaryPos,$xInt_L$+i−3)                    (8-754)

$yInt_i$=Clip3(SubPicTopBoundaryPos,SubPicBot-
    BoundaryPos,$yInt_L$+i−3)                    (8-755)

Otherwise (subpic_treated_as_pic_flag[SubPicIdx] is equal to 0), the following applies:

$xInt_i$=Clip3(0,picW−1,sps_ref_wraparound_enabled_
    flag?ClipH((sps_ref_wraparound_offset_mi-
    nus1+1)*MinCbSizeY,picW,$xInt_L$+i−3): $xInt_L$+i−
    3)

$yInt_i$=Clip3(0,picH−1,$yInt_{L+i}$−3)

If hori_scale_fp is equal to (1<<14) and vert_scale_fp is equal to (1<<14), the luma locations in full-sample units are further modified as follows for i=0 . . . 7:

$xInt_i$=Clip3($xSbInt_L$−3,$xSbInt_{L+sbWidth+}$4,$xInt_i$)

$yInt_i$=Clip3($ySbInt_L$−3,$ySbInt_L$+sbHeight+4,$yInt_i$)

The predicted luma sample value $predSampleLX_L$ is derived as follows:
If both $xFrac_L$ and $yFrac_L$ are equal to 0, and both hori_scale_fp and vert_scale_fp are less than 20481, the value of $predSampleLX_L$ is derived as follows:

$predSampleLX_L$=$refPicLX_L$[$xInt_3$][$yInt_3$]<<shift3

8.5.6.3.4 Chroma Sample Interpolation Process
If hori_scale_fp is equal to (1<<14) and vert_scale_fp is equal to (1<<14), the chroma locations in full-sample units ($xInt_i, yInt_i$) are further modified as follows for i=0 . . . 3:

$xInt_i$=Clip3($xSbInt_C$−3,$xSbInt_{C+sbWidth+}$2,$xInt_i$)           (8-774)

$yInt_i$=Clip3($ySbInt_C$−3,$ySbInt_C$+sbHeight+2,$yInt_i$)           (8-775)

f. Another exemplary spec change based on JVET-P2001-v9 is as below:
8.5.6.3.2 Luma Sample Interpolation Filtering Process
The luma locations in full-sample units ($xInt_i, yInt_i$) are derived as follows for i=0 . . . 7:
If subpic_treated_as_pic_flag[SubPicIdx] is equal to 1, the following applies:

$xInt_i$=Clip3(SubPicLeftBoundaryPos,SubPicRight-
    BoundaryPos,$xInt_L$+i−3)                    (8-754)

$yInt_i$=Clip3(SubPicTopBoundaryPos,SubPicBot-
    BoundaryPos,$yInt_L$+i−3)                    (8-755)

Otherwise (subpic_treated_as_pic_flag[SubPicIdx] is equal to 0), the following applies:

$xInt_i$=Clip3(0,picW−1,sps_ref_wraparound_enabled_
    flag?ClipH((sps_ref_wraparound_offset_mi-
    nus1+1)*MinCbSizeY,picW,$xInt_L$+i−3): $xInt_L$+i−
    3)

$yInt_i$=Clip3(0,picH−1 $yInt_L$+i−3)

The luma locations in full-sample units are further modified as follows for i=0 . . . 7:

```
If hori_scale_fp is equal to (1<<14)
   and vert_scale_fp is equal to (1<<14),
```

$xInt_i = Clip3(xSbInt_L - 3, xSbInt_L + sbWidth + 4, xInt_i)$

```
If hori_scale_fp is equal to (1<<14)
   and vert_scale_fp is equal to (1<<14),
```

$yInt_i = Clip3(ySbInt_L - 3, ySbInt_L + sbHeight + 4, yInt_i)$

The predicted luma sample value predSampleLX$_L$ is derived as follows:
If both xFrac$_L$ and yFrac$_L$ are equal to 0, and both hori_scale_fp and vert_scale_fp are less than 20481, the value of predSampleLX$_L$ is derived as follows:

predSampleLX$_L$ = refPicLX$_L$[xInt$_3$][yInt$_3$] << shift3

8.5.6.3.4 Chroma Sample Interpolation Process

The chroma locations in full-sample units (xInt$_i$, yInt$_i$) are further modified as follows for i=0 . . . 3:

```
If hori_scale_fp is equal to (1<<14)
   and vert_scale_fp is equal to (1<<14),
```

$xInt_i = Clip3(xSbIntC - 1, xSbIntC + sbWidth + 2, xInt_i)$ (8-774)

```
If hori_scale_fp is equal to (1<<14)
   and vert_scale_fp is equal to (1<<14),
```

$yInt_i = Clip3(ySbIntC - 1, ySbIntC + sbHeight + 2, yInt_i)$ (8-775)

19. Whether and/or how to apply the integer sample clipping operation on luma and/or chroma samples may depend on whether a coding tool X is applied. (E.g. X is Decoder-side Motion Vector Refinement (DMVR)).
   a. In one example, the integer sample clipping operation is applied only if coding tool X is applied.
   b. In one example, the integer sample clipping operation is applied only if coding tool X is not applied.

Figure 3:
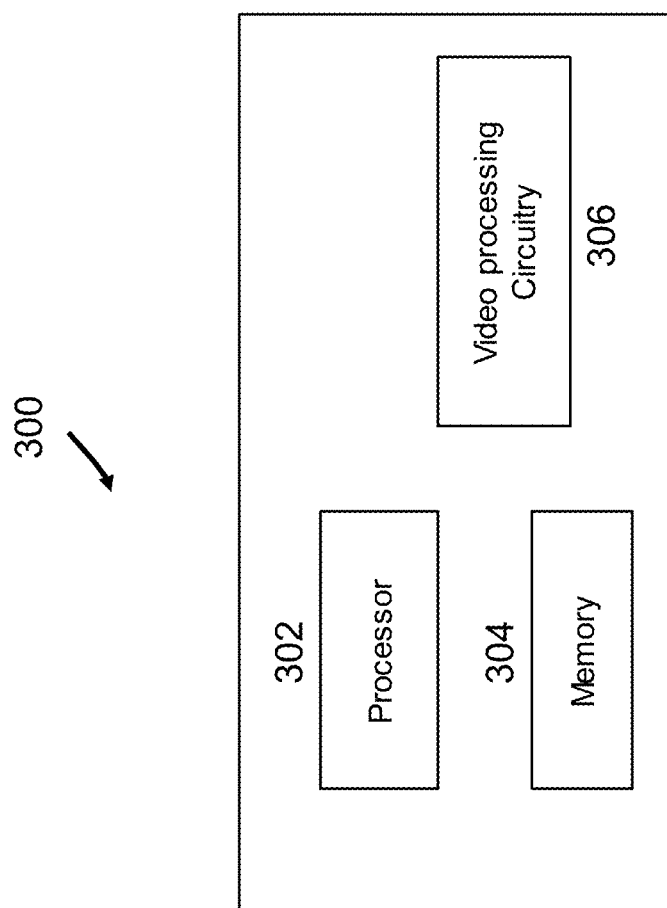
FIG. 3 is a block diagram of an example implementation of a hardware platform for video processing.

FIG. 3 is a block diagram of a video processing apparatus 300. The apparatus 300 may be used to implement one or more of the methods described herein. The apparatus 300 may be embodied in a smartphone, tablet, computer, Internet of Things (IoT) receiver, and so on. The apparatus 300 may include one or more processors 302, one or more memories 304 and video processing hardware 306. The processor(s) 302 may be configured to implement one or more methods described in the present document. The memory (memories) 304 may be used for storing data and code used for implementing the methods and techniques described herein. The video processing hardware 306 may be used to implement, in hardware circuitry, some techniques described in the present document. In some embodiments, the hardware 306 may be partly or entirely within the processors 302, e.g., a graphics processor.

The following solutions may be implemented as preferred solutions in some embodiments.

The following solutions may be implemented together with additional techniques described in items listed in the previous section (e.g., item 1).

Figure 4:
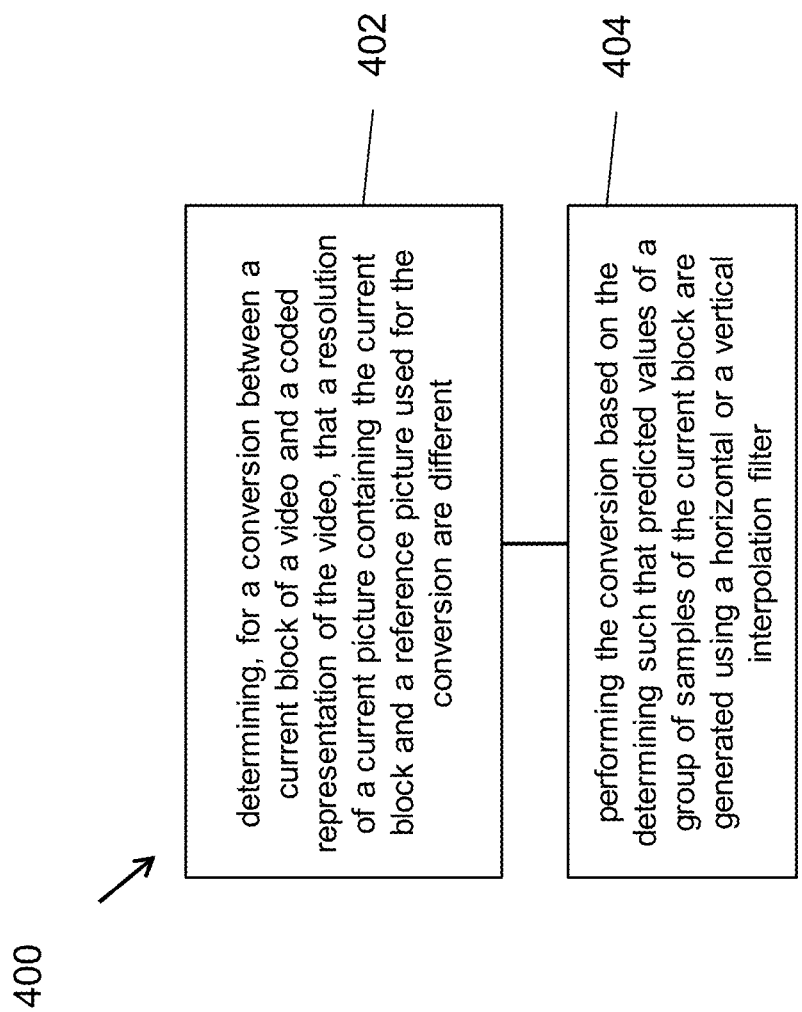
FIG. 4 is a flowchart for an example method of video processing.

1. A method of video processing (e.g., method 400 depicted in FIG. 4), comprising determining (402), for a conversion between a current block of a video and a coded representation of the video, that a resolution of a current picture containing the current block and a reference picture used for the conversion are different, and performing (404) the conversion based on the determining such that predicted values of a group of samples of the current block are generated using a horizontal or a vertical interpolation filter.

2. The method of solution 1, wherein the group of samples corresponds to all samples of the current block.

3. The method of solution 1, wherein the group of samples corresponds to some samples of the current block.

4 The method of solution 3, wherein the group of samples corresponds to all samples of a region in the current block.

5. The method of any of solutions 1-4, wherein the group of samples is selected to have a same motion vector (MV) used during the conversion.

6. The method of any of solutions 1-4, wherein the group of samples have a same horizontal motion vector component.

7. The method of any of solutions 1-4, wherein the group of samples have a same vertical motion vector component.

8. The method of any of solutions 1-4, wherein the group of samples have a same fractional horizontal motion vector component part 9. The method of any of solutions 1-4, wherein the group of samples have a same fractional vertical motion vector component part.

10. The method of any of solutions 1-9, wherein, during the conversion, a motion vector for a specific sample is derived by modifying a value of motion vector derived based on the resolution of the current picture and the resolution of the reference picture by a modification step including truncating, clipping or rounding.

11. The method of any of solutions 1-7, wherein, during the conversion, a motion vector for a specific sample is set to a value of a shared motion vector that is shared by all samples in the group of samples.

12. The method of any of solutions 1-9, wherein the group of samples share a shared motion vector during the conversion, and wherein the shared motion vector is derived from motion vectors of one or more samples in the group of samples.

13. The method of solution 11, wherein the shared motion vector is further derived from a virtual sample.

The following solutions may be implemented together with additional techniques described in items listed in the previous section (e.g., item 5).

14. A method of video processing, comprising: determining, for a conversion between a current block of a video and a coded representation of the video, that a resolution of a current picture containing the current block and a reference picture used for the conversion are different, and performing the conversion based on the determining such that predicted values of a group of samples of the current block are generated as an interpolated version of a virtual reference block that is generated by sample rate changing a region in the reference picture, wherein the sample rate changing depends on a height or a width of the current picture or the reference picture.

15. The method of solution 14, wherein the interpolated version is generated using an interpolation filter whose coefficients do not depend on the height or the width of the current picture or the reference picture.

The following solutions may be implemented together with additional techniques described in items listed in the previous section (e.g., item 6).

16. A method of video processing, comprising: determining, for a conversion between a current block of a video and a coded representation of the video, that a resolution of a current picture containing the current block and a reference picture used for the conversion are different, and based on the determining, deriving a top-left coordinate of a bounding block for reference sample padding based on a scheme that is dependent on a height or a width of the current picture or the reference picture, and performing the conversion using the derived top-left coordinate of the bounding box.

17. The method of solution 16, the scheme comprises calculating luma samples located at integer sample locations as:

$$xInt_i=Clip3(xSbInt_L-Dx,xSbInt_L+sbWidth+Ux,xInt_i),$$

$$yInt_i=Clip3(ySbInt_L-Dy,ySbInt_L+sbWidth+Uy,yInt_i),$$

where Dx and/or Dy and/or Ux and/or Uy depend on the width and/or the height of the current picture or the reference picture, and wherein $(xSbInt_L,ySbInt_L)$ is the top left coordinate.

18. The method of solution 16, the scheme comprises calculating chroma samples located at integer sample locations as:

$$xInti=Clip3(xSbInt_C-Dx,xSbInt_C+sbWidth+Ux,xInti),$$

$$yInti=Clip3(ySbInt_C-Dy,ySbInt_C+sbWidth+Uy,yInti),$$

where Dx and/or Dy and/or Ux and/or Uy depend on the width and/or the height of the current picture or the reference picture, and wherein $(xSbInt_L,ySbInt_L)$ is the top left coordinate.

The following solutions may be implemented together with additional techniques described in items listed in the previous section (e.g., item 7).

19. A method of video processing, comprising: determining, for a conversion between a current block in a current picture of a video and a coded representation of the video, a clipping operation applied to motion vector calculation according to a bounding block for reference sample padding, based on use of a decoder side motion vector refinement (DMVR) during the conversion of the current block; and performing the conversion based on the clipping operation.

20. The method of solution 19, wherein the determining enables a legacy clipping operation due to the DMVR being used for the current block.

21. The method of any of solutions 19-20, wherein the current block is a chroma block.

The following solutions may be implemented together with additional techniques described in items listed in the previous section (e.g., item 8).

22. A method of video processing, comprising: determining, for a conversion between a current block in a current picture of a video and a coded representation of the video, a clipping operation applied to motion vector calculation according to a bounding block for reference sample padding, based on use of picture wrapping in the conversion; and performing the conversion based on the clipping operation.

23. The method of solution 22, wherein the determining enables a legacy clipping operation only if the picture wrapping is disabled for the current block.

24. The method of any of solutions 22-23, wherein the current block is a chroma block.

25. The method of any of solutions 22-23, wherein the clipping operation is used to calculate luma samples as:

$$xInt_i=Clip3(xSbInt_L-Dx,xSbInt_L+sbWidth+Ux,xInt_i),$$

$$yInt_i=Clip3(ySbInt_L-Dy,ySbInt_L+sbWidth+Uy,yInt_i),$$

where Dx and/or Dy and/or Ux and/or Uy depend on the use of picture wrapping, and wherein $(xSbInt_L,ySbInt_L)$ represents the bounding block.

26. The method of any of solutions 1 to 25, wherein the conversion comprises encoding the video into the coded representation.

27. The method of any of solutions 1 to 25, wherein the conversion comprises decoding the coded representation to generate pixel values of the video.

28. A video decoding apparatus comprising a processor configured to implement a method recited in one or more of solutions 1 to 27.

29. A video encoding apparatus comprising a processor configured to implement a method recited in one or more of solutions 1 to 27.

30. A computer program product having computer code stored thereon, the code, when executed by a processor, causes the processor to implement a method recited in any of solutions 1 to 27.

31. A method, apparatus or system described in the present document.

Figure 6:
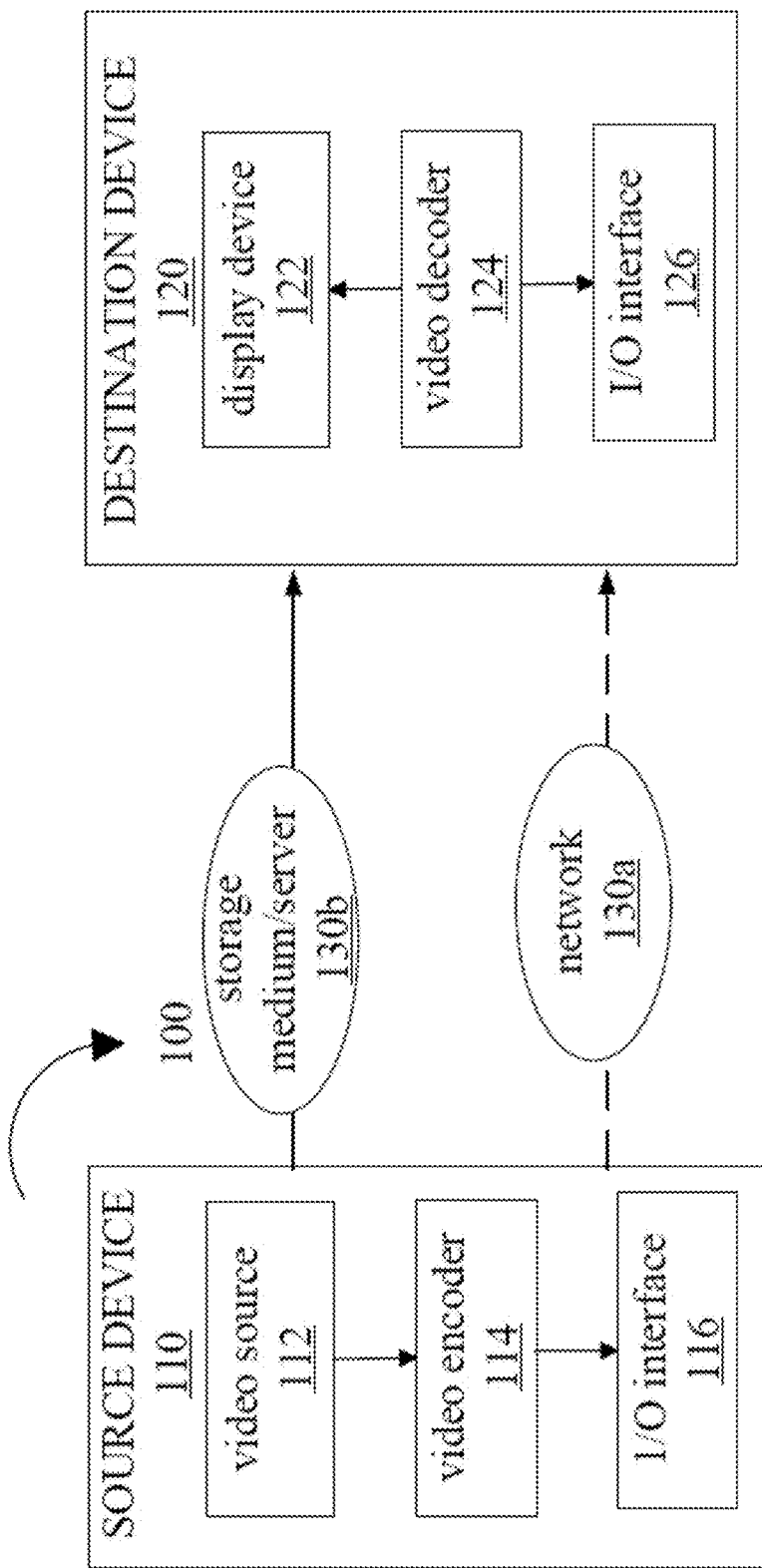
FIG. 6 is a block diagram of an example implementation of a video coding system.

FIG. 6 is a block diagram that illustrates an example video coding system 100 that may utilize the techniques of this disclosure.

As shown in FIG. 6, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. video encoder 114 encodes the video data from video source 112 to generate a bitstream. The bitstream may include a sequence of bits that form a coded representation of the video data. The bitstream may include coded pictures and associated data. A coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/the server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard presently, VVM standard and other current and/or further standard.

Figure 7:
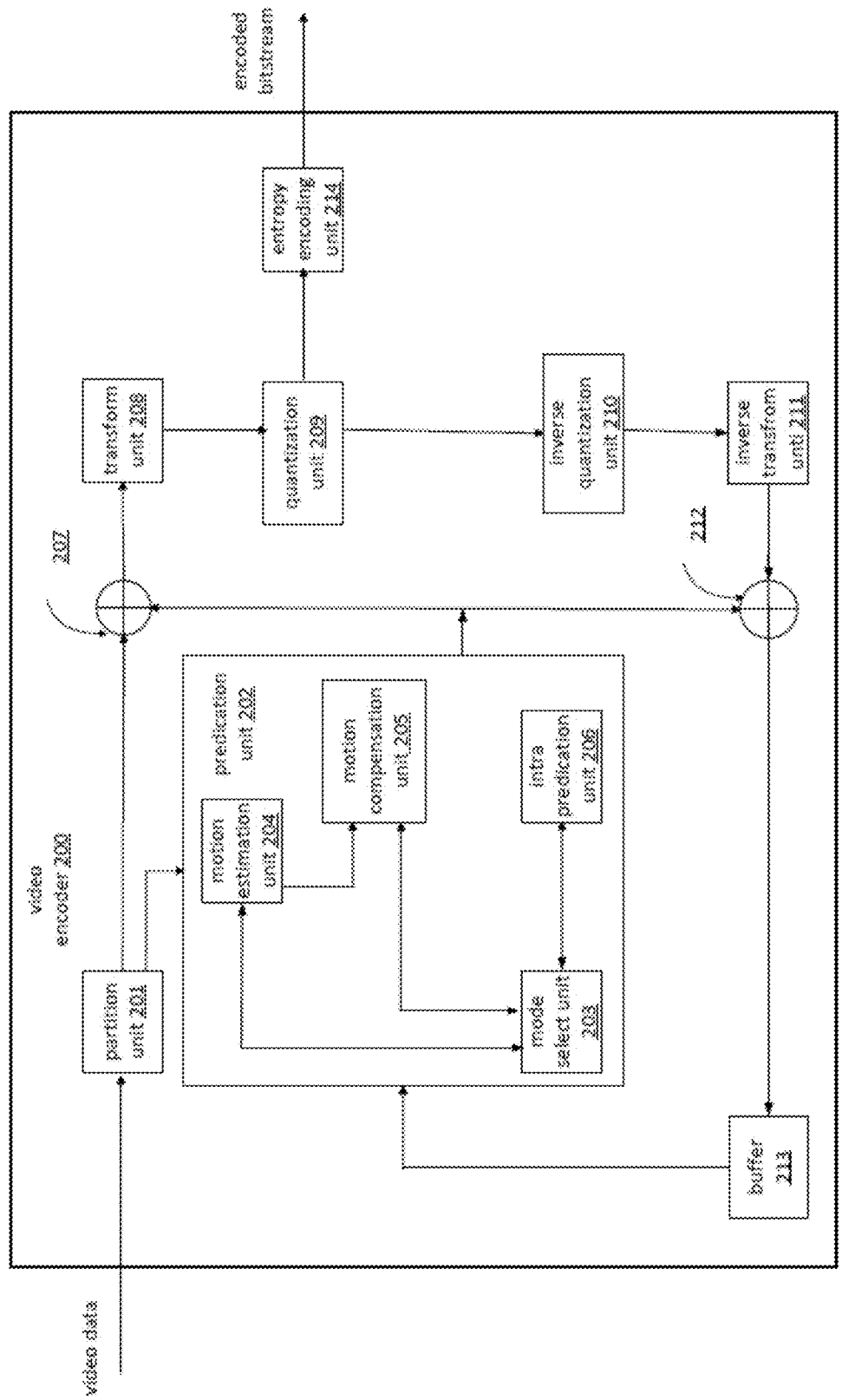
FIG. 7 is a block diagram of an example implementation of a video encoder.

FIG. 7 is a block diagram illustrating an example of video encoder 200, which may be video encoder 112 in the system 100 illustrated in FIG. 6.

The video encoder 200 may be configured to perform any or all of the techniques of this disclosure. In the example of FIG. 7, the video encoder 200 includes a plurality of functional components. The techniques described in this disclosure may be shared among the various components of the video encoder 200. In some examples, a processor may be configured to perform any or all of the techniques described in this disclosure.

The functional components of the video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 7 separately for purposes of explanation.

partition unit 201 may partite a current picture into one or more video blocks. The video encoder 200 and the video decoder 300 may support various video block sizes.

Mode select unit 203 may select one of the coding modes, intra or inter, e.g., based on error results, and provides the resulting intra- or inter-coded block to a residual generation unit 206 to generate residual block data and to a reconstruction unit 211 to reconstruct the encoded block for use as a reference picture. In some example, Mode select unit 203 may select a combination of intra and inter predication (CIIP) mode in which the predication is based on a inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures, from buffer 213 other than the picture associated with the current video block (e.g., reference pictures).

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 does not output a full set of motion information for the current video for example to entropy encoding unit 214. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize a transform coefficient video block associated with the current video block based on a quantization parameter (QP) value associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 202 may add the reconstructed residual video block to corresponding samples from one or more predicted video blocks generated by the predication unit to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 8:
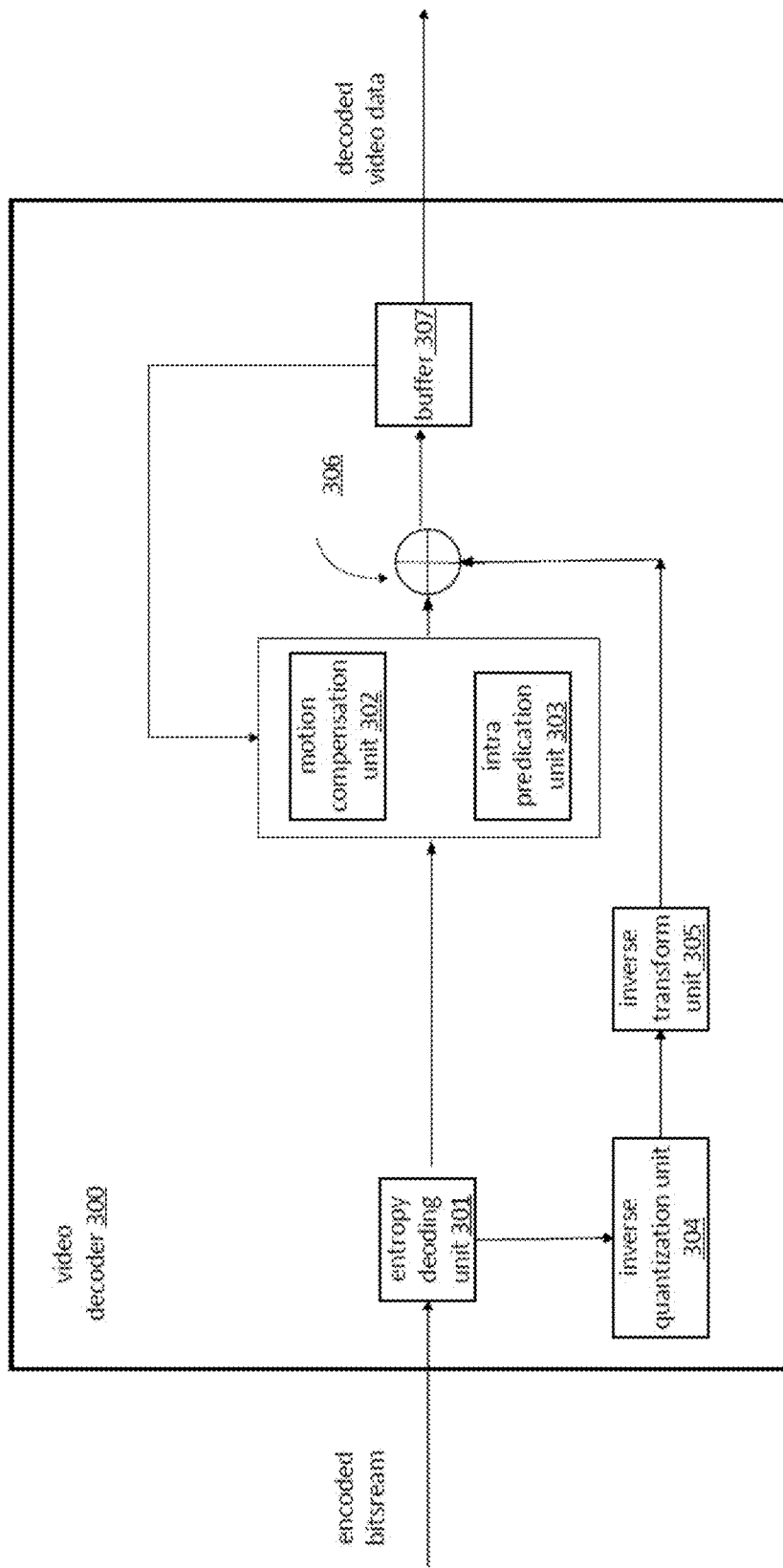
FIG. 8 is a block diagram of an example implementation of a video decoder.

FIG. 8 is a block diagram illustrating an example of video decoder 300 which may be video decoder 114 in the system 100 illustrated in FIG. 6. The video decoder 300 may be configured to perform any or all of the techniques of this disclosure. In the example of FIG. 8, the video decoder 300 includes a plurality of functional components. The techniques described in this disclosure may be shared among the various components of the video decoder 300. In some examples, a processor may be configured to perform any or all of the techniques described in this disclosure.

In the example of FIG. 8, video decoder 300 includes an entropy decoding unit 301, motion compensation unit 302, intra prediction unit 303, inverse transformation unit 304, inverse quantization unit 305, and reconstruction unit 306 and buffer 307. Video decoder 300 may, in some examples, perform a decoding pass generally reciprocal to the encoding pass described with respect to video encoder 200 (FIG. 7).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may use motion vectors and/or MVDs received in the bitstream to identify a prediction video block in reference picture in buffer 307.

Motion compensation unit 302 produces motion compensated blocks, possibly performing interpolation based on interpolation filters. Identifiers for interpolation filters to be used for motion estimation with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation and also produces decoded video for presentation on a display device and also produces decoded video for presentation on a display device.

In the above solutions, the performing the conversion includes using the results of previous decision step during the encoding or decoding operation to arrive at the conversion results.

Some preferred embodiments of the disclosed technical solutions are described below. Additional details of these solutions are described throughout the present document including, for example, in item 14 of the previous section.

Figure 9:
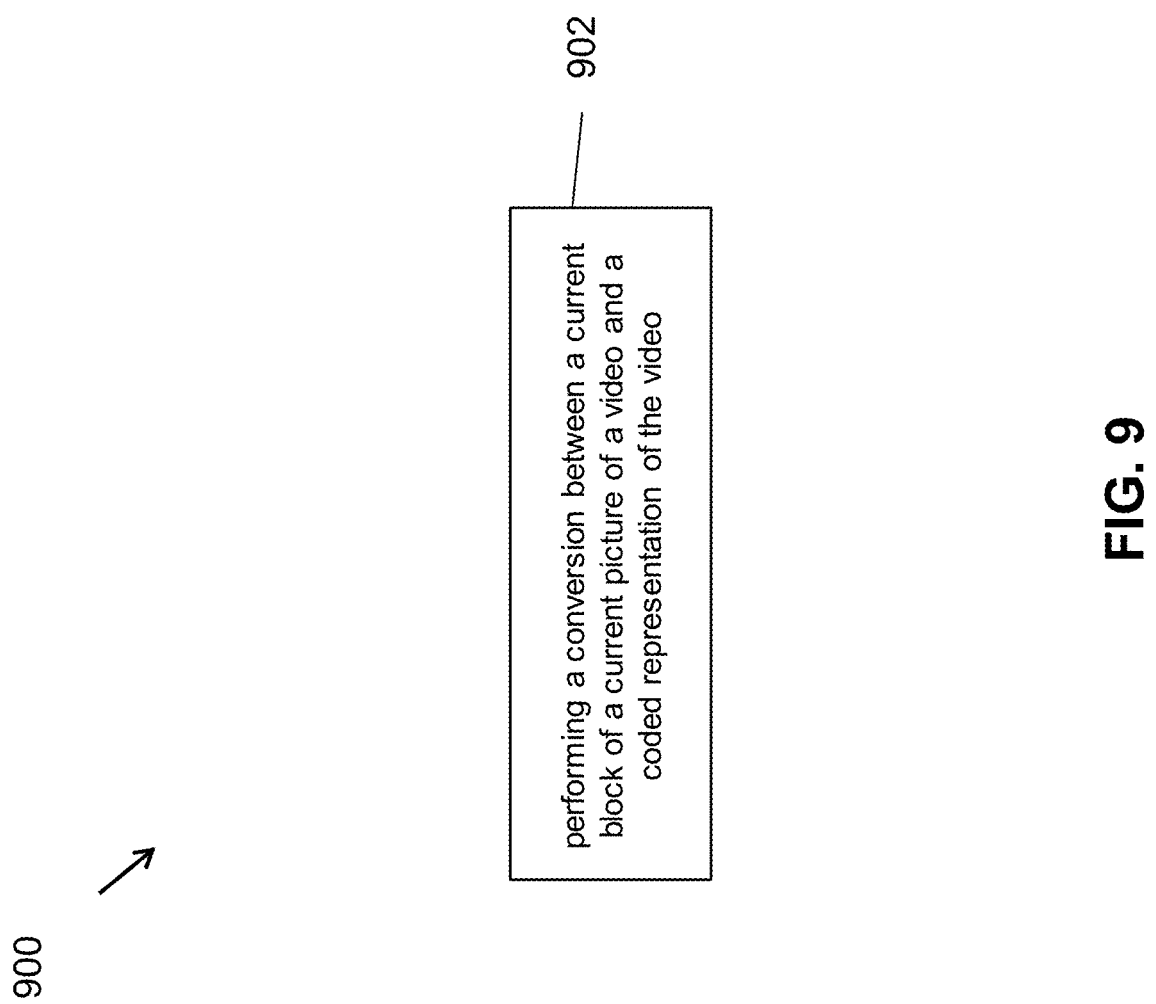
FIG. 9 is a flowchart for an example method of video processing.

1. A method of video processing (e.g., method 900 shown in FIG. 9), comprising: performing (902) a conversion between a current block of a current picture of a video and a coded representation of the video; wherein the coded representation is according to a format rule, wherein the format rule specifies to selectively include one or more syntax elements about a wraparound clipping operation applied to a reference picture for determining a prediction block for the current video block, wherein the wraparound clipping operation is used to reselect samples in the reference picture in case that a motion vector points to samples outside a bounding block in the reference picture.

2. The method of solution 1, wherein the format rule specifies that a syntax element of the one or more syntax elements is included in a picture parameter set (PPS).

3. The method of solution 2, wherein the format rule specifies that the syntax element included in the PPS indicates whether the wraparound clipping operation is enabled in a horizontal direction.

4. The method of solution 3, wherein a "1" value of the syntax element indicates that the wraparound clipping operation is enabled in the horizontal direction, and a value "0" of the syntax element indicates that the wraparound clipping operation is disabled in the horizontal direction.

5. The method of solution 1, wherein the rule specifies to include a first syntax element at a first video unit level and a second syntax element at a second unit level indicative of whether the wraparound clipping operation is enabled.

6. The method of solution 5, wherein the second syntax element refers to the first syntax element.

7. The method of any of solutions 5-6, wherein the first syntax element and/or the second syntax element signal indicates whether the wraparound clipping operation is enabled for the current block.

8. The method of any of solutions 5-7, wherein the format rule specifies that a value of the second syntax element is dependent on a value of the first syntax element.

9. The method of solution 8, wherein the format rule specifies that, in case that the first syntax element indicates that the wraparound clipping operation is disabled, then the second syntax element also indicates that the wraparound clipping operation is disabled.

10. The method of any of solutions 1-2, wherein the format rule specifies to include a syntax element indicative of an offset used for the wraparound clipping operation.

11. The method of solution 1, wherein the format rule specifies that the one or more syntax elements comprises a first syntax element indicative of whether the wraparound clipping operation is enabled and a second syntax element that is conditionally includes depending on enablement of the wraparound clipping operation.

12. The method of solution 11, wherein the second syntax element is conditionally included in the coded representation in case that the first syntax element has a value 1.

13. The method of any of solutions 5-9, wherein the first video unit level is a video sequence level and wherein the first syntax element is included in a sequence parameter set.

14. The method of any of solutions 5-9 or 13, wherein the second video unit level is a video picture level or a video slice level.

15. The method of any of solutions 5-9 or 13, wherein the second syntax element is in a picture parameter set or a slice header or a picture header or an adaptation parameter set.

16. The method of any of solutions 5-9, wherein the first syntax element and/or the second syntax element signal an amount of wraparound offset to be used for the wraparound clipping operation.

17. The method of any of solutions 8-16, wherein the format rule specifies that the first syntax element and the second syntax elements are equal to each other.

18. The method of any of solutions 8-16, wherein the format rule specifies that, in case that the first syntax element indicates that the wraparound clipping operation is enabled, then the second syntax element is allowed to have a first value that indicates that the wraparound clipping operation is enabled or a second value that indicates that the wraparound clipping operation is disabled.

19. The method of any of solutions 5-18, wherein the format rule specifies that, in case that both the first syntax element and the second syntax element are included in the coded representation, then the value of the first syntax element is ignored during decoding the current block from the coded representation.

20. The method of any of solutions 7-17, wherein the format rule specifies that, in case that both the first syntax element and the second syntax element are included in the coded representation, then the value of the second syntax element is ignored during decoding the current block from the coded representation.

21. The method of any of solutions 7-20, wherein the format rule specifies that a value of the first syntax element and/or a value of the second syntax element is dependent on a first size associated with a coding tree block of the current block and a second size associated with a width of the current picture containing the current block.

22. The method of solution 20, wherein the first size is equal to (CtbSizeY/MinCbSizeY+Offset1), wherein CtbSizeY is a height or a width of the coding tree block, MinCbSizeY indicates a minimum allowed size for coding blocks in the conversion and Offset1 is an integer, and wherein the second size is equal to (pic_width_in_luma_samples/MinCbSizeY−Offset2), where pic_width_in_luma_samples indicates a width of the current picture in luma samples indicated in a picture parameter set and Offset2 is another integer.

23. The method of solution 21, wherein the format rule specifies that the first syntax element or the second syntax element indicates that the wraparound clipping operation is disabled due to the first size not being greater than the second size.

24. The method of solution 21, wherein the format rule specifies that the first syntax element or the second syntax element indicates that the wraparound clipping operation is disabled due to the first size not being less than or equal to the second size.

25. The method of solution 21, wherein the format rule specifies that the first syntax element or the second syntax element indicates that the wraparound clipping operation is disabled due to the first size not being less than the second size.

26. The method of solution 21, wherein the format rule specifies that the first syntax element or the second syntax element indicates that the wraparound clipping operation is disabled due to the first size being greater than or equal to the second size.

27. The method of any of solutions 21-26, wherein the picture parameter set refers to a sequence parameter set applicable to the current picture.

28. The method of solution 21, wherein the format rule specifies that the first syntax element or the second syntax element indicates that the wraparound clipping operation is disabled due to the first size being greater than the second size.

29. The method of solution 21, wherein the format rule specifies that the first syntax element or the second syntax element indicates that the wraparound clipping operation is disabled due to the first size not being less than or equal to the second size.

30. The method of solution 21, wherein the format rule specifies that the first syntax element or the second syntax element indicates that the wraparound clipping operation is disabled due to the first size not being less than the second size.

31. The method of solution 21, wherein the format rule specifies that the first syntax element or the second syntax element indicates that the wraparound clipping operation is disabled due to the first size not being greater than or equal to the second size.

32. The method of any of solutions 22-31, wherein offset2=offset1=1.

33. The method of solution 1, wherein the format rule specifies that the syntax element is includes in an adaptation parameter set.

34. The method of solution 1, wherein the format rule specifies that the syntax element is included in a header filed of the current picture or a current slice that includes the current block.

35. The method of solution 1, wherein the format rule specifies that the syntax element is includes at a picture level or a view level or a slice level or a tile level or a brick level or a sub-picture level or a coding tree unit level.

36. The method of any of solutions 1 to 35, wherein the conversion comprises encoding the video into the coded representation.

37. The method of any of solutions 1 to 35, wherein the conversion comprises decoding the coded representation to generate pixel values of the video.

38. A video decoding apparatus comprising a processor configured to implement a method recited in one or more of solutions 1 to 37.

39. A video encoding apparatus comprising a processor configured to implement a method recited in one or more of solutions 1 to 37.

40. A computer program product having computer code stored thereon, the code, when executed by a processor, causes the processor to implement a method recited in any of solutions 1 to 37.

41. A computer-readable medium having code stored thereon, the code, upon execution by a processor, causing the processor to implement a method recited in any of solutions 1 to 37.

42. A computer readable medium that stores a bitstream representation generated according to any of solutions to 1 to 37.

43. A method, apparatus or system described in the present document.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
determining, for a conversion between a current block of a current picture of a video and a bitstream of the video, usage of a wraparound clipping operation that is applied to a reference picture for determining a prediction block for the current block based on at least one syntax element;

performing the conversion based on the determining;
wherein the wraparound clipping operation is used to reselect samples in the reference picture in case that samples are outside the reference picture, and
wherein the at least one syntax element includes a first syntax element included in a picture parameter set (PPS), wherein the first syntax element indicates whether the wraparound clipping operation is enabled in a horizontal direction for the current block, and wherein a value of the first syntax element depends on a first size associated with a coding tree block of the current block and a second size associated with a width of the current picture comprising the current block.

2. The method of claim 1, wherein the at least one syntax element includes a second syntax element included in a sequence parameter set (SPS), and the second syntax element indicates whether the wraparound clipping operation is enabled in the horizontal direction for the current block.

3. The method of claim 2, wherein the value of the first syntax element depends on a value of the second syntax element.

4. The method of claim 3, wherein the first syntax element indicates the wraparound clipping operation is disabled in case that the second syntax element indicates the wraparound clipping operation is disabled for the current block.

5. The method of claim 3, wherein the first syntax element is conditionally included in the bitstream in case that the second syntax element indicates the wraparound clipping operation is enabled for the current block.

6. The method of claim 1, wherein the first syntax element indicates that the wraparound clipping operation is disabled in case that the first size is greater than the second size.

7. The method of claim 1, wherein the first size is equal to (CtbSizeY/MinCbSizeY+Offset1), where CtbSizeY indicates a height or a width of the coding tree block of the current block, MinCbSizeY indicates a minimum allowed size for coding blocks for the conversion, and Offset1 is an integer, and
wherein the second size is equal to (pic_width_in_luma_samples/MinCbSizeY— Offset2), where pic_width_in_luma_samples indicates a width of the current picture in luma samples indicated in the picture parameter set, and Offset2 is an integer.

8. The method of claim 7, wherein Offset2=Offset1=1.

9. The method of claim 1, wherein the value of the first syntax element being "1" indicates that the wraparound clipping operation is enabled in the horizontal direction, and the value of the first syntax element being "0" indicates that the wraparound clipping operation is disabled in the horizontal direction.

10. The method of claim 1, wherein the conversion comprises encoding the current block into the bitstream.

11. The method of claim 1, wherein the conversion comprises decoding the current block from the bitstream.

12. An apparatus for processing video data comprising a processor and a non-transitory memory with instructions thereon, wherein the instructions upon execution by the processor, cause the processor to:
determine, for a conversion between a current block of a current picture of a video and a bitstream of the video, usage of a wraparound clipping operation that is applied to a reference picture for determining a prediction block for the current block based on at least one syntax element;
perform the conversion based on the determination;
wherein the wraparound clipping operation is used to reselect samples in the reference picture in case that samples are outside the reference picture, and
wherein the at least one syntax element includes a first syntax element included in a picture parameter set (PPS), wherein the first syntax element indicates whether the wraparound clipping operation is enabled in a horizontal direction for the current block, and wherein a value of the first syntax element depends on a first size associated with a coding tree block of the current block and a second size associated with a width of the current picture comprising the current block.

13. The apparatus of claim 12, wherein the at least one syntax element includes a second syntax element included in a sequence parameter set (SPS), and the second syntax element indicates whether the wraparound clipping operation is enabled in the horizontal direction for the current block.

14. A non-transitory computer-readable storage medium storing instructions that cause a processor to:
determine, for a conversion between a current block of a current picture of a video and a bitstream of the video, usage of a wraparound clipping operation that is applied to a reference picture for determining a prediction block for the current block based on at least one syntax element;
perform the conversion based on the determination;
wherein the wraparound clipping operation is used to reselect samples in the reference picture in case that samples are outside the reference picture, and
wherein the at least one syntax element includes a first syntax element included in a picture parameter set (PPS), wherein the first syntax element indicates whether the wraparound clipping operation is enabled in a horizontal direction for the current block, and wherein a value of the first syntax element depends on a first size associated with a coding tree block of the current block and a second size associated with a width of the current picture comprising the current block.

15. A non-transitory computer-readable recording medium storing a bitstream of a video which is generated by a method performed by a video processing apparatus, wherein the method comprises:
determining, for a current block of a current picture of the video, usage of a wraparound clipping operation that is applied to a reference picture for determining a prediction block for the current block based on at least one syntax element;
generating the bitstream based on the determining;
wherein the wraparound clipping operation is used to reselect samples in the reference picture in case that samples are outside the reference picture, and
wherein the at least one syntax element includes a first syntax element included in a picture parameter set (PPS), wherein the first syntax element indicates whether the wraparound clipping operation is enabled in a horizontal direction for the current block, and wherein a value of the first syntax element depends on a first size associated with a coding tree block of the current block and a second size associated with a width of the current picture comprising the current block.

16. The apparatus of claim 13, wherein the value of the first syntax element depends on a value of the second syntax element.

17. The apparatus of claim 16, wherein the first syntax element indicates the wraparound clipping operation is disabled in case that the second syntax element indicates the wraparound clipping operation is disabled for the current block.

18. The apparatus of claim 17, wherein the first syntax element is conditionally included in the bitstream in case that the second syntax element indicates the wraparound clipping operation is enabled for the current block.

19. The apparatus of claim 12, wherein the first syntax element indicates that the wraparound clipping operation is disabled in case that the first size is greater than the second size.

20. The apparatus of claim 12, wherein the first size is equal to (CtbSizeY/MinCbSizeY+Offset1), where CtbSizeY indicates a height or a width of the coding tree block of the current block, MinCbSizeY indicates a minimum allowed size for coding blocks for the conversion, and Offset1 is an integer, and wherein the second size is equal to (pic_width_in_luma_samples/MinCbSizeY— Offset2), where pic_width_in_luma_samples indicates a width of the current picture in luma samples indicated in the picture parameter set, and Offset2 is an integer.

21. The apparatus of claim 20, wherein Offset2=Offset1=1.

* * * * *